(12) United States Patent
Rosales et al.

(10) Patent No.: US 11,460,847 B2
(45) Date of Patent: Oct. 4, 2022

(54) CONTROLLER FOR AN AUTONOMOUS VEHICLE, AND NETWORK COMPONENT

(71) Applicant: Intel Corporation, Santa Clara, CA (US)

(72) Inventors: Rafael Rosales, Unterhaching (DE); Florian Geissler, Munich (DE); Ignacio Alvarez, Portland, OR (US); Neslihan Kose Cihangir, Munich (DE)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 16/831,957

(22) Filed: Mar. 27, 2020

(65) Prior Publication Data

US 2020/0249683 A1 Aug. 6, 2020

(51) Int. Cl.
*G05D 1/02* (2020.01)
*B60W 60/00* (2020.01)
*G01C 21/34* (2006.01)

(52) U.S. Cl.
CPC ....... *G05D 1/0214* (2013.01); *B60W 60/0011* (2020.02); *G01C 21/3407* (2013.01); *G05D 2201/0213* (2013.01)

(58) Field of Classification Search
CPC ........ G05D 1/0214; G05D 2201/0213; B60W 60/0011; B60W 2556/45; G01C 21/3407; G08G 1/166; G08G 1/164
See application file for complete search history.

(56) References Cited

U.S. PATENT DOCUMENTS

| 2018/0164825 | A1* | 6/2018 | Matus | G05D 1/0214 |
| 2019/0113918 | A1 | 4/2019 | Englard et al. | |
| 2019/0193734 | A1 | 6/2019 | Ekl et al. | |
| 2020/0269871 | A1* | 8/2020 | Schmidt | B60W 60/0011 |
| 2021/0245758 | A1* | 8/2021 | Ahmad | B60W 30/18163 |

FOREIGN PATENT DOCUMENTS

WO WO-2021164875 A1 * 8/2021

OTHER PUBLICATIONS

Lehmann, B. et al., "A Generic Approach towards Maneuver Coordination for Automated Vehicles", 2018 21st IEEE International Conference on Intelligent Transportation Systems (ITSC 2018), dated Nov. 4-7, 2018, pp. 3333-3339, IEEE, Hawaii, USA.
Dagdeviren, O. et al., "A Hierarchical Leader Election Protocol for Mobile Ad Hoc Networks", International Conference on Computational Science (ICCS 2008), dated Jun. 23-25, 2008, pp. 509-518, Springer, Kraków, Poland.

(Continued)

*Primary Examiner* — Rodney A Butler
(74) *Attorney, Agent, or Firm* — Viering, Jentschura & Partner mbB

(57) ABSTRACT

A controller for an autonomous vehicle may include: one or more processors configured to: determine a maneuver planned for the vehicle based on a safety driving model and based on a first message from a network component external to the vehicle, the first message including a respective assessment for each proposed maneuver of at least two maneuvers proposed for the vehicle, and provide an in-vehicle instruction to perform the maneuver planned for the vehicle.

18 Claims, 18 Drawing Sheets

(56) References Cited

OTHER PUBLICATIONS

Saxena, A. et al., "Recurrent Neural Networks for Driver Activity Anticipation via Sensory-Fusion Architecture", 2016 IEEE International Conference on Robotics and Automation (ICRA 2016), dated May 16-21, 2016, pp. 3118-3125, IEEE, Stockholm, Sweden.
Stone, P. et al., "Multiagent traffic management: A Reservation-Based Intersection Control Mechanism", Proceedings of the Third International Joint Conference on Autonomous Agents and Multiagent Systems (AAMAS 2004), dated Jul. 19-24, 2004, pp. 530-537, IEEE, New York, USA.
European Search Repod issued for European Application No. 20207424. 1, dated Apr. 21, 2021, 9 pages (for informational purposes only).

\* cited by examiner

| Header: (ID, physical position, time stamp) | Keep sharing Maneuver intent [YES/NO] | driving parameter | Maneuver list: | M0 (Maneuver, Safety level, preference level) | M1 (Maneuver, Safety level, preference level) | Certificate /signatures |

FIG. 12
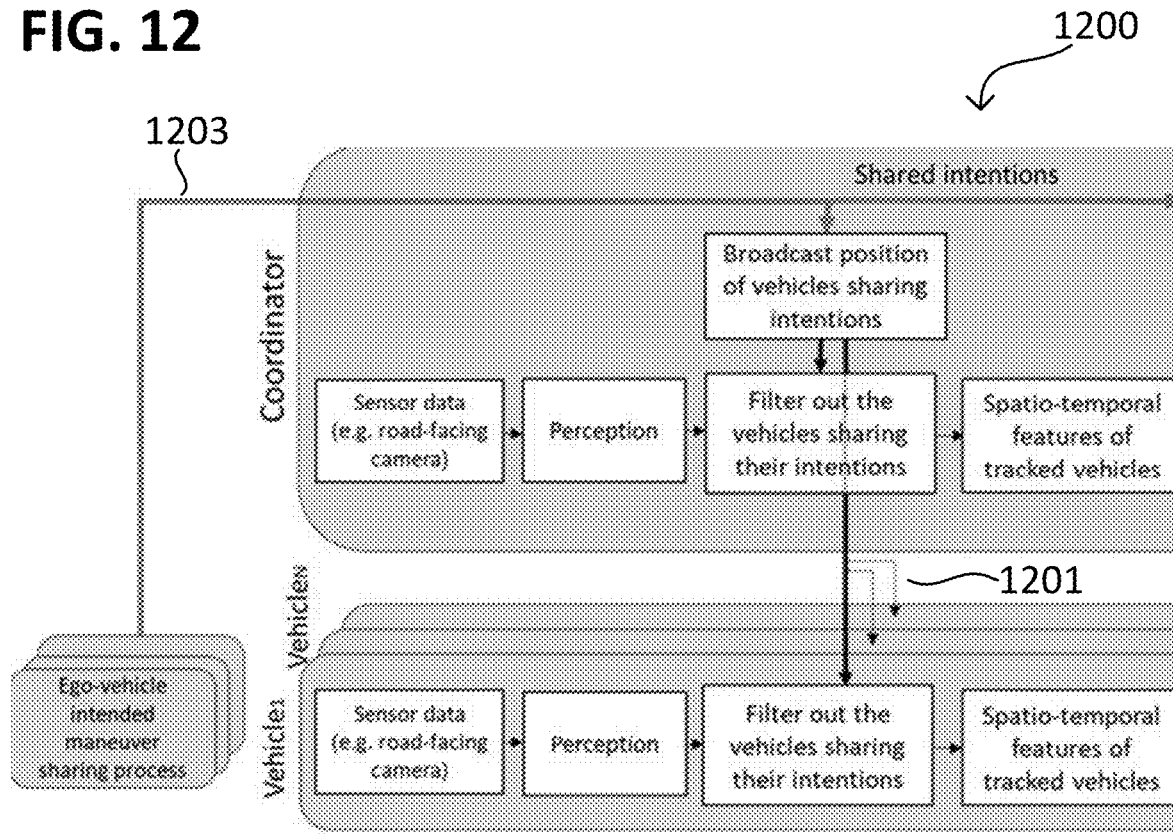
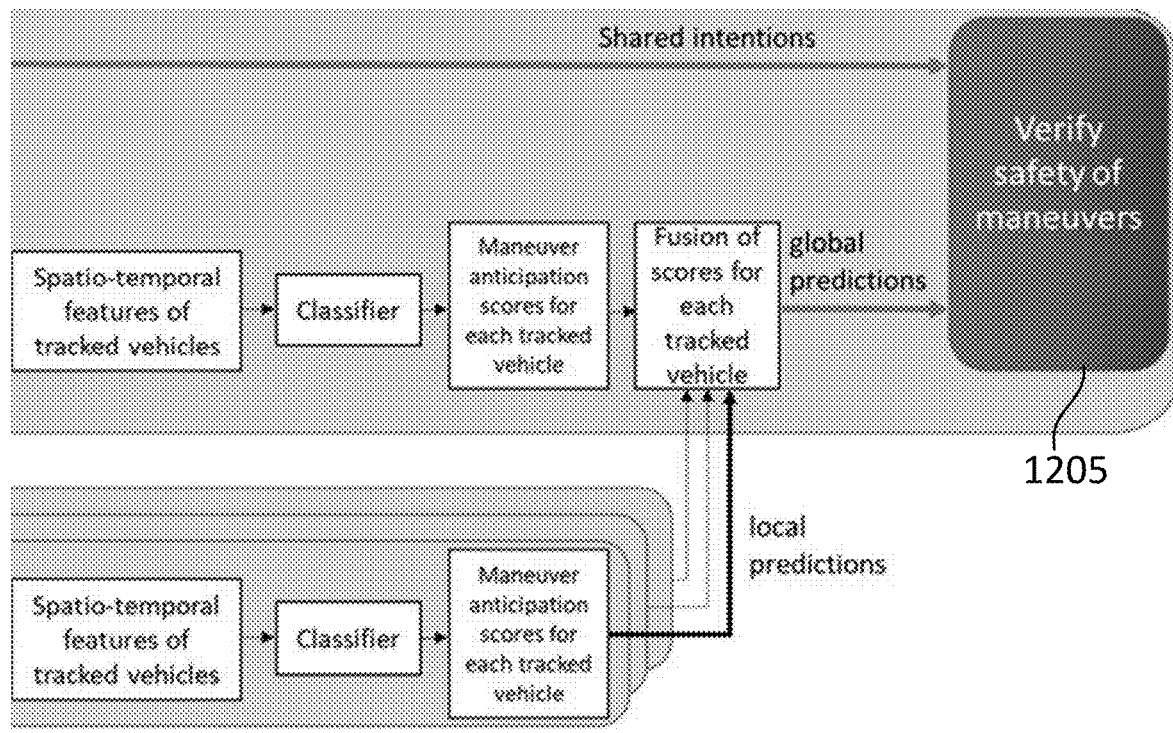

CONTROLLER FOR AN AUTONOMOUS VEHICLE, AND NETWORK COMPONENT

TECHNICAL FIELD

Various aspects of this disclosure generally relate to a controller for an autonomous vehicle, and a network component.

BACKGROUND

Autonomous Driving (AD) utilizes reliable driving safety systems that process detected data of the environment of an autonomous vehicle (AV) to implement a driving policy of the autonomous vehicle (AV). To this end, various driving models such as various safety driving models have been developed.

The implementation of safety monitoring approaches, such as driving models, constrain possible vehicle reaction responses to guarantee behaviors that will avoid accidents by detecting dangerous situations and act responsibly. However, in some scenarios, no timely appropriate reaction is possible, as it may be too late for a vehicle to react once it is compromised in a dangerous situation with few maneuver alternatives.

BRIEF DESCRIPTION OF THE DRAWINGS

In the drawings, like reference characters generally refer to the same parts throughout the different views. The drawings are not necessarily to scale, emphasis instead generally being placed upon illustrating exemplary principles of the disclosure. In the following description, various exemplary embodiments of the disclosure are described with reference to the following drawings, in which:

FIG. 11 shows an exemplarily message architecture according to various aspects of the disclosure in a schematic architecture diagram;

FIG. 12 shows an exemplary implementation of the method according to various aspects of the disclosure;

DESCRIPTION

Figure 1:
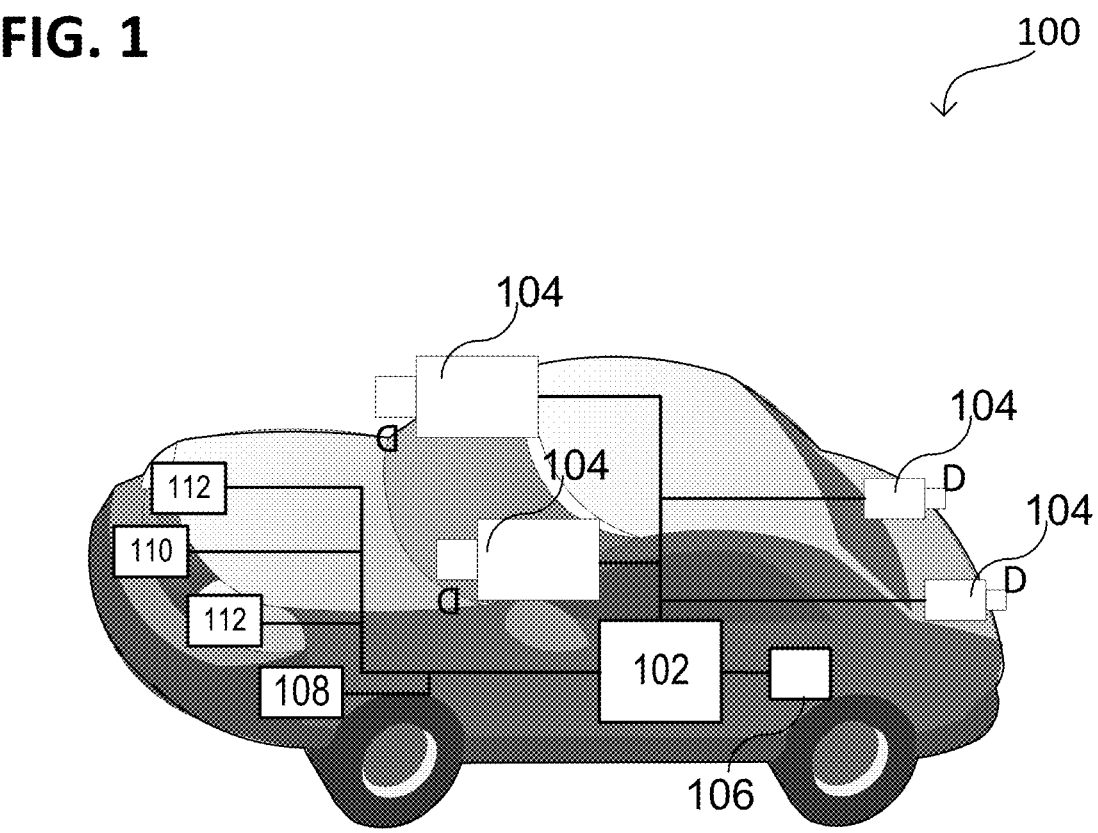
FIG. 1 shows an exemplary autonomous vehicle in accordance with various aspects of the disclosure in a schematic architecture diagram.

The following detailed description refers to the accompanying drawings that show, by way of illustration, exemplary details and embodiments in which aspects of the disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components, such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The transmission of any type information (information transmission) may be in accordance with a communication protocol. Generally, the transmission of information may include generating and/or sending a message including the information in accordance with the communication protocol. The communication protocol may indicate an agreement according to which the information is transmitted between two or more components. In the simplest form, the communication protocol may be defined as a set of rules that define the syntax, semantics and synchronization of the transmission. The communication protocol(s) used (e.g. one or more network protocols) may be (but need not to be) configured according to the OSI (Open System Interconnect) reference model. Any protocols can also be used in the respective protocol layers. For example, the transmission of information via a certain type of network may include generating and/or sending a message including the information according to a network communication protocol.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

The vehicle detailed herein may be, as an example, a ground vehicle. A "ground vehicle" may be understood to include any type of vehicle, as described above, which is configured to traverse the ground, e.g., on a street, on a road, on a track, on one or more rails, off-road, etc.

The term "autonomous vehicle" may describe a vehicle capable of implementing at least one navigational change (also referred to as maneuver) without driver input. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

A navigational change may describe or include a change in one or more of direction of movement and/or velocity of movement, e.g., by actions like steering, acceleration and/or deceleration (also referred to as braking) of the vehicle. The navigational change may include a single action (e.g., braking) or a sequence of events (e.g., steering multiple times). Thus, examples of a maneuver may include a less complex maneuver, such as adapting the velocity of the vehicle to the velocity of the preceding vehicle. Also, examples of a maneuver may include a more complex maneuver, such as a sequence of velocity changes and steering actions to change the lane. To transmit the maneuver as information (also referred to as maneuver data), a message indicating the maneuver the may be generated in accordance with a maneuver indication protocol. The maneuver indication protocol may implement a set of rules that define the syntax and semantics for describing the maneuver as information (e.g., representing a formal language), e.g., using timestamps and/or spatial coordinates. Thus, the maneuver data (also referred to more simply as a maneuver) included in the message may be a representation of the maneuver, e.g., the maneuver to be executed.

For example, a maneuver (e.g., each type of action) may be described in the formal language, e.g., by referring to the individual action(s), when and/or where one or more actions are taken (e.g., using timestamps and/or spatial coordinates). As an example, a maneuver may be described as semantic actions, such as "turn left", "turn right", "change lane", and the like, which when put in a sequence may be used to describe a more complex maneuver. As another example, a maneuver may be described as trajectory of the vehicle, e.g., a node based trajectory. Examples for spatial coordinates may include Cartesian coordinates, geographic coordinates, road coordinates (e.g., curvilinear coordinates), and the like.

The term "model" may, for example, used herein may be understood as any kind of algorithm, which provides output data from input data (e.g., any kind of algorithm generating or calculating output data from input data). As an example, the model may include one or more machine learning models.

Various embodiments herein may utilize one or more machine learning models to perform or control functions of the vehicle (or other functions described herein). A machine learning model may be executed by a computing system to progressively improve performance of a specific task. In some aspects, parameters of a machine learning model may be adjusted during a training phase based on training data. A trained machine learning model may be used during an inference phase to provide predictions or decisions as output data based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may, in some aspects, be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models, e.g., an algorithm that performs a classification. In a classification model, the output data may be restricted to a limited set of values (e.g., one or more classes). The classification model may output a class for an input set of one or more input values. An input set may include sensor data, such as image data, radar data, LIDAR data, maneuver data and the like. A classification model as described herein may, for example, classify certain maneuvers, driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

A machine learning model described herein may be or may include a neural network. The neural network may be any kind of neural network, such as a convolutional neural network (CNN), an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the disclosure, the following terms will be used as synonyms: driving parameter set, driving model parameter set, safety layer parameter set, driver assistance, automated driving model parameter set, and/or the like (e.g., driving safety parameter set).

Furthermore, throughout the disclosure, the following terms will be used as synonyms: driving parameter, driving model parameter, safety layer parameter, driver assistance and/or automated driving model parameter, and/or the like (e.g., driving safety parameter).

The aspects disclosed herein reduce the need of imposing the responsibility of granting maneuvers on a central coordinator, which are then executed in trust by coordinated vehicles, as for example, resulting from a centralized control approach. As an example, a centralized control approach may include a reservation-based control approach, by which the vehicles request usage rights on sections of time and space. If no conflicts are detected, the reservation is granted. If not, the vehicle is not allowed to enter the sections. However, the centralized control approach may not fulfill acceptable safety specifications, as the safety critical decisions are made by a third party controlling the central coordinator.

The aspects disclosed herein reduce the complexity and facilitate a scaling to larger scenarios, e.g., compared to a decentralized coordination approach that works without a central coordinator. As an example, a decentralized control approach may be based on cooperative awareness provided by short range and cellular Vehicle-to-everything (V2X) communications, by which the vehicles exchange the current location information with other vehicles. Another example of a decentralized control approach utilizes Vehicle-to-vehicle (V2V) communication to provide for a detection, a coordination request, a maneuver acceptance, and a maneuver execution, by which maneuver conflicts are negotiated without any central coordinator.

Herein, reference is made to components providing functions according to various aspects, such as network components and vehicles. It may be understood that the components may each include one or more processors configured to perform the respective functions. Analogously code segments may be provided, which, when executed by one or more processors, may cause the processor to perform the respective functions.

FIG. 1 shows an exemplary vehicle, namely vehicle 100, in accordance with various aspects of the disclosure. In some aspects, vehicle 100 may include processors 102 and one or more sensors 104, 106, 108, 110, 112 (also referred to as vehicular sensors). Examples for the one or more one or more sensors 104, 106, 108, 110, 112 may include one or more image acquisition devices 104, one or more position sensors 106, one or more speed sensors 108, one or more radar sensors 110, and/or one or more LIDAR sensors 112.

In some aspects, vehicle 100 may include a safety system 200 (as described with respect to FIG. 2 below). It is appreciated that vehicle 100 and safety system 200 are exemplary in nature and may thus be simplified for explanatory purposes. Locations of elements and relational distances (as discussed above, the figures are not to scale) are provided as examples and are not limited thereto. The safety system 200 may include various components depending on the particular implementation.

Figure 2:
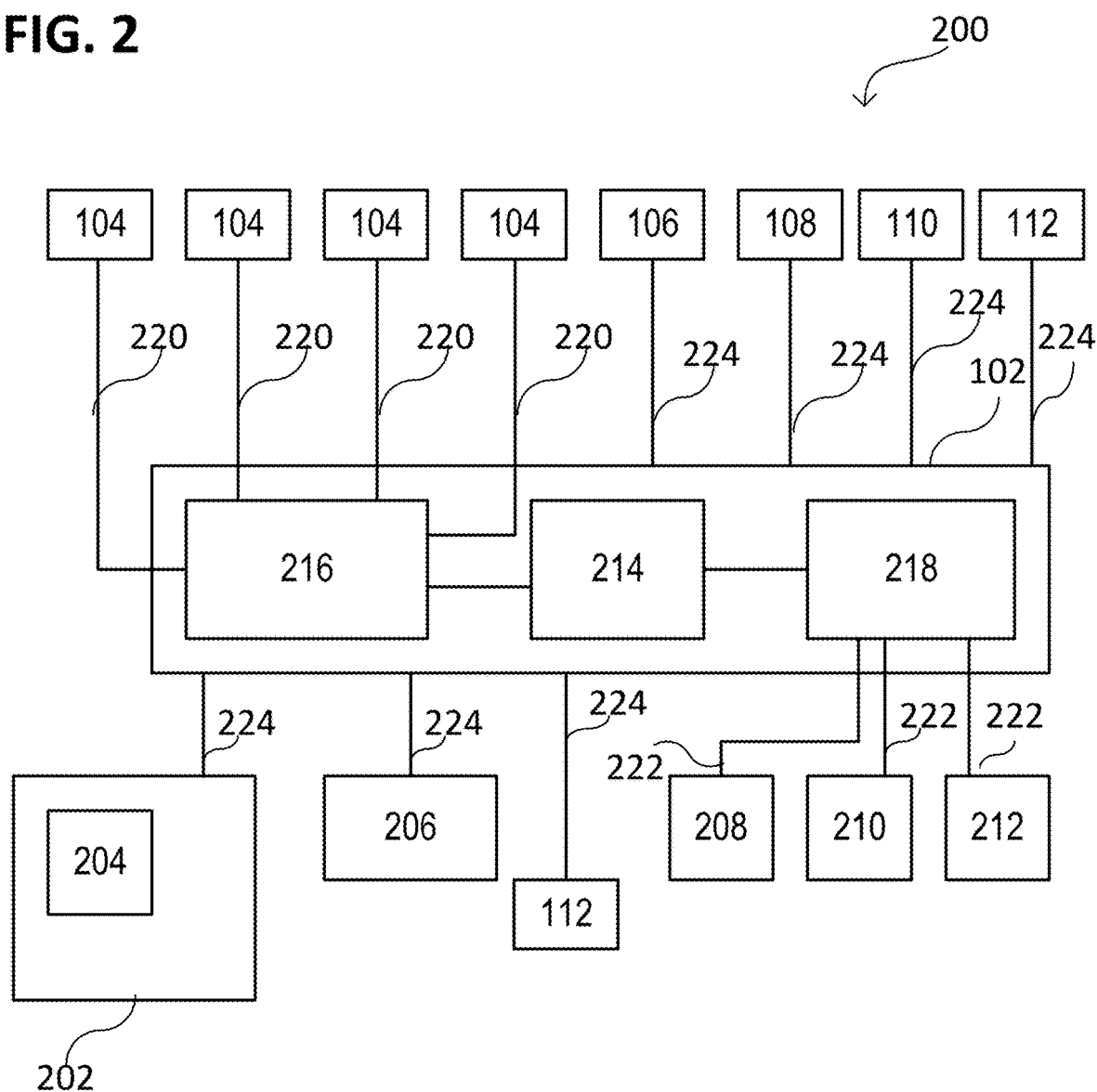
FIG. 2 shows various exemplary electronic components of a safety system of the vehicle in accordance with various aspects of the disclosure in a schematic interconnection diagram.

FIG. 2 shows various exemplary electronic components of a vehicle, namely safety system 200, in accordance with various aspects of the disclosure. In some aspects, the safety system 200 may include one or more processors 102 and one or more sensors, for example, one or more image acquisition devices 104 (e.g., one or more cameras), one or more position sensors 106 (e.g., a Global Navigation Satellite System (GNSS), a Global Positioning System (GPS), among others) one or more speed sensors 108, one or more radar sensors 110, and/or one or more LIDAR sensors 112. According to at least one aspect, safety system 200 may further include one or more memories 202, one or more map databases 204, one or more user interfaces 206 (e.g., a display, a touch screen, a microphone, a loudspeaker, one or more buttons and/or switches, etc.), and/or one or more wireless transceivers 208, 210, 212. The wireless transceivers 208, 210, 212 may, in some aspects, be configured according to the same, different, or any combination thereof radio communication protocols or standards. By way of example, a wireless transceiver (e.g., a first wireless transceiver 208) may be configured in accordance with a Short Range mobile radio communication standard (e.g., Bluetooth, Zigbee, among others). As another example, a wireless transceiver (e.g., a second wireless transceiver 210) may be configured in accordance with a Medium or Wide Range mobile radio communication standard (e.g., 3G (e.g. Universal Mobile Telecommunications System—UMTS), 4G (e.g. Long Term Evolution—LTE), and/or 5G mobile radio communication standard in accordance with corresponding 3GPP ($3^{rd}$ Generation Partnership Project) standards, among others). As a further example, a wireless transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more wireless transceivers 208, 210, 212 may be configured to transmit signals via an antenna system over an air interface.

In some aspects, the one or more processors 102 may include an application processor 214, an image processor 216, a communication processor 218, and/or any other suitable processing device. Image acquisition device(s) 104 may, for example, include any number of image acquisition devices and components depending on the particular application. Image acquisition devices 104 may include one or more image capture devices (e.g., cameras, CCDs (charge coupling devices), or any other type of image sensor).

In at least one aspect, the safety system 200 may also include a data interface communicatively connecting the one or more processors 102 to the one or more image acquisition devices 104. For example, a first data interface may include any wired and/or wireless first link 220 or first links 220 configured to transmit image data acquired by the one or more image acquisition devices 104 to the one or more processors 102 (e.g., to the image processor 216).

The wireless transceivers 208, 210, 212 may, in some aspects, be coupled to the one or more processors 102 (e.g., to the communication processor 218) via, for example a second data interface. The second data interface may include any wired and/or wireless second link 222 or second links 222 configured to transmit radio transmitted data acquired by wireless transceivers 208, 210, 212 to the one or more processors 102, e.g., to the communication processor 218.

In some aspects, the memories 202 as well as the one or more user interfaces 206 may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Such transmissions may also include communications (e.g., one-way or two-way) between the vehicle 100 and one or more other (target) vehicles in an environment (vicinity) of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and other protocols.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the safety system. A memory of the one or more memories 202 may store one or more databases and image processing software, as well as a trained system, such as a neural network, or a deep neural network, for example. The one or more memories 202 may include any number of random access memories, read-only memories, flash memories, disk drives, optical storage, tape storage, removable storage and other types of storage.

In some aspects, the safety system 200 may further include components such as a speed sensor 108 (e.g., a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), and the like. The radar sensors 110 and/or the LIDAR sensors 112 may be configured to provide pre-processed sensor data, such as radar target lists or LIDAR target lists. The third data interface may couple the speed sensor 108, the one or more radar sensors 110 and the one or more LIDAR sensors 112 to at least one of the one or more processors 102.

The one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database 204 may include any type of database storing (digital) map data for the vehicle 100, e.g., for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the safety system 200 may include a driving model, e.g., implemented in an advanced driving assistance system (ADAS) and/or a driving assistance and automated driving system. By way of example, the safety system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving (ground) vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

The safety driving model detailed herein, may optionally be configured to provide a classification of one or more maneuvers as output data. As an example, the classification may include an rating, e.g., a urgency rating, a preference rating and/or a safety rating. Herein, a rating may be determined according to a rating criterion. Illustratively, the rating criterion reflects to criterion, under which the rating is determined. For example, the rating criterion may be an urgency, a preference and/or a safety, thus providing a respective urgency rating, preference rating and/or safety rating. As an example, the classification may include an assessment, such as a safety assessment representing the risk of a potential conflict of a maneuver, that is the safety of the maneuver. It is to be noted that these classifications are not limiting and not exclusive and can be amended in various aspects as desired.

A safety driving model may implement logic to apply driving behavior rules such as the following five rules:
  Do not hit someone from behind.
  Do not cut-in recklessly.
  Right-of-way is given, not taken.
  Be careful of areas with limited visibility.

If you can avoid an accident without causing another one, you must do it.

It is to be noted that these rules are not limiting and not exclusive and can be amended in various aspects as desired. The rules rather represent a social driving contract that might be different depending on the region and may also develop over time. While these five rules are currently applicable in most of the countries they might not be complete and may be amended.

As described above, the vehicle 100 may include the safety system 200 as also described with reference to FIG. 2.

The vehicle 100 may include the one or more processors 102 (also referred to as vehicular processors 102), e.g. integrated with or separate from an engine control unit (ECU) of the vehicle 100.

The safety system 200 may in general generate data to control or assist to control the ECU and/or other components of the vehicle 100 to directly or indirectly control the driving of the vehicle 100.

According to various aspects, the vehicle 100 may include a vehicular communication network (e.g., fieldbus communication network) for the communication of the various components with each other, e.g., via links 220, 222, 224. The vehicular communication network may be for, e.g., real-time distributed, communication, e.g., via a message-based communication protocol. The vehicular communication network may be provided, for example, in a daisy-chain, star, ring, branch, and/or tree network topology or a mixture thereof. The order and priority of a multiple of messages that are send via the vehicular communication network is defined by the vehicular communication network protocol. Such vehicular communication network protocol may be configured for real-time distributed control, e.g., standardized as International Electrotechnical Commission (IEC) 61158 (title "Digital data communications for measurement and control—Fieldbus for use in industrial control systems", e.g., in the version of May 2, 2017). For example, the vehicular communication network may connect one or more controllers, one or more the sensors, one or more transmitters and/or one or more actors (e.g., of the powertrain) of the vehicle 100 with each other.

Figure 3:
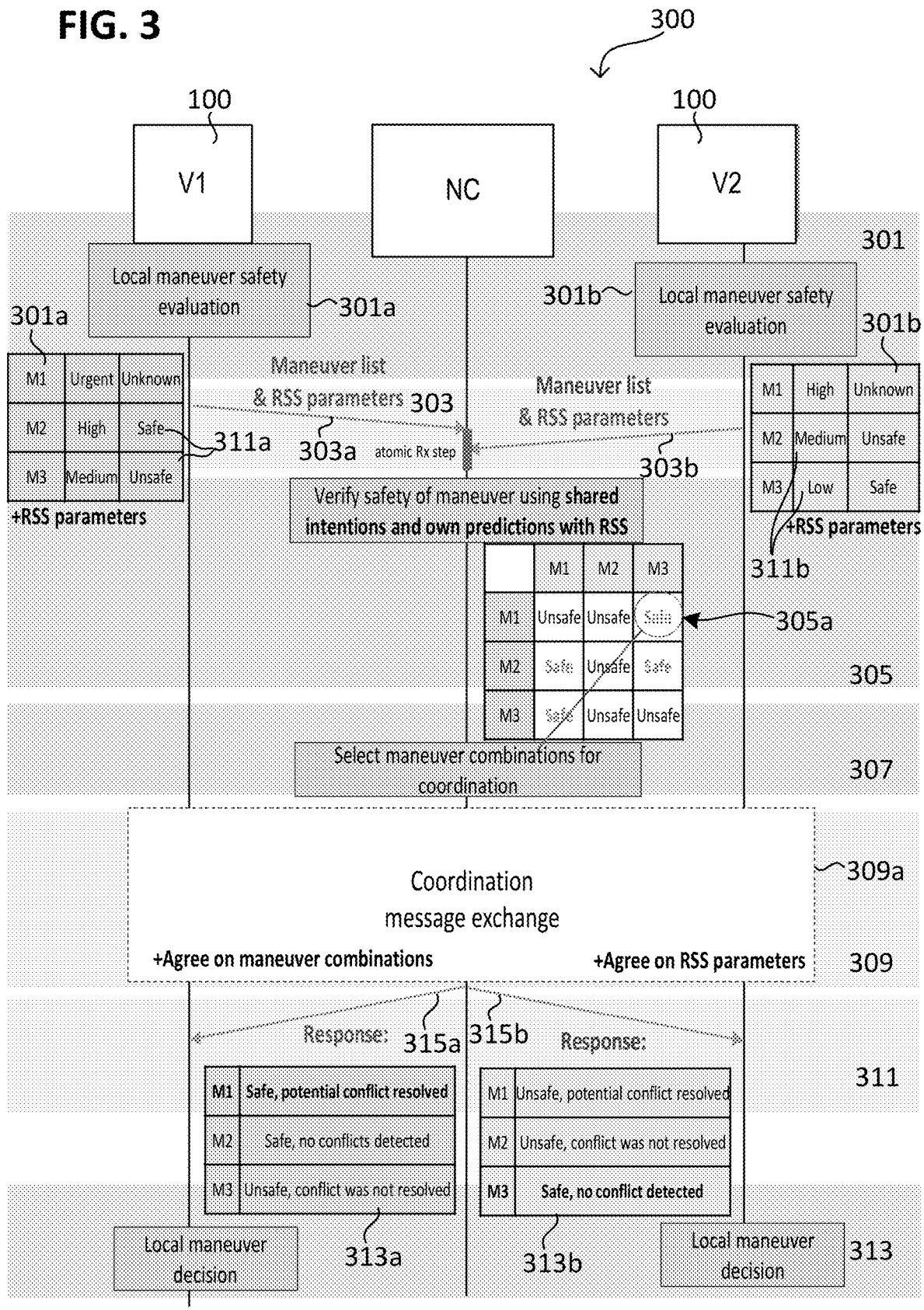
FIG. 3 shows an exemplary method according to various aspects of the disclosure in a schematic flow diagram.

FIG. 3 shows an exemplary method 300 according to various aspects as implemented by various components, namely a first vehicle V1, a second vehicle V2, and a vehicle-external network component NC (that is, a network component external to the first vehicle V1 and/or external to the second vehicle V2). It may be understood, that one or more aspects of method 300 may be implemented without other aspects of method 300, e.g., via a processor performing functions according to the one or more aspects of method 300.

Illustratively, the network component NC provides for a coordinator between various vehicles, such as the first vehicle V1 and the second vehicle V2 as examples. In the following, reference is made to a group of two vehicles V1, V2 for demonstrative purposes, which is not intended to be limiting. The references made may be applied to more than two vehicle, e.g., to a group of N vehicles. For example, N may be 2 or more, e.g., 5 or more, e.g., 10 or more, e.g., 20 or more, e.g., 50 or more, e.g., 100 or more, e.g., 500 or more, e.g., 1000 or more. The group of N vehicles may include the first vehicle V1 representing vehicle 100 and one or more second vehicles V2, each of which is represented by the detailed second vehicle V2.

Stated differently, the method 300 may be applied analogously to a group of N vehicles including the first vehicle V1 and N−1 second vehicles V2. Illustratively, the first vehicle V1 may be the vehicle 100 in ego-perspective (also referred to as Ego-vehicle). The following functions, communications and actions, which are outlined with respect to the method 300 for one vehicle 100 of the group of N vehicles may, in various aspects, apply analogously to the first vehicle V1 and/or to the second vehicle V2, e.g., to each of the group of N vehicles.

One or more aspects of the method 300 may be implemented by a controller for a vehicle (also referred to as vehicular controller). The vehicular controller may include one or more vehicular processors 102. In the following, the method 300 may be described with reference to individual functions for demonstrative purposes, which are not intended to be limiting. It may be understood that, in various aspects, two or more functions may chronologically overlap or be merged. It may be understood that, in various aspects, two or more functions may be rearranged in their order, according to the particular application. It may be understood that, in various aspects, components of two or more functions may be exchanged, according to the particular application.

The one or more vehicular processors 102 may be configured to, in 301 (also referred to as maneuver determination 301), determine a maneuver list 301a, 301b including a plurality of potential maneuvers 301a, 301b of the respective vehicle 100 based on the safety driving model; and, in 303 (also referred to as maneuver sharing 303), transmit 303a, 303b the maneuver list 301a, 301b to the network component NC. Illustratively, the potential maneuvers reflect the maneuver alternatives of the vehicle 100 from the ego-perspective.

In various aspects, the maneuver list 301a, 301b may be determined based on sensor data related to the vehicle 100. For example, the sensor data may be provided by one or more sensors of the vehicle 100 (also referred to as vehicular sensors). Additionally or alternatively, the sensor data may be provided by one or more sensors external from the vehicle 100 (also referred to as external sensor(s)). Examples of the one or more external sensors include: one or more stationary sensors (such as roadside sensors); one or more sensors of at least one other vehicle. The sensor data may include information about the vehicle 100 and/or a vicinity of the vehicle 100. Examples of the information about the vehicle 100 may include the velocity of the vehicle 100, the location of the vehicle 100, routing information of the vehicle 100, direction of movement of the vehicle 100, and the like. Examples of the information about the vicinity of the vehicle 100 may include: one or more obstructions, one or more traffic participants (such as their velocity, type, location, size, direction of movement, and the like), course of the road, one or more traffic signs. Examples of the traffic participant may include: a vehicle, a pedestrian, a cyclist, and the like.

In various aspects, the maneuver list 301a, 301b may be determined based on the safety driving model of the vehicle 100. For example, the sensor data may be fed to the safety driving model of the vehicle 100 as input data, e.g., including one or more input parameter (also referred to as input driving parameter). The safety driving model may be configured to output, in response, the maneuver list 301a, 301b as output data, e.g., including one or more output parameters (also referred to as output driving parameter(s)).

Optionally, the maneuver list 301a, 301b may include, for each potential maneuver, one or more of the parameters provided by or to the safety driving model.

Examples of the one or more parameters provided to the safety driving model may include the input parameter of the safety driving model. The one or more of the parameters provided to the safety driving model may include contextual information, e.g., representing, on which basis the maneuver list 301a, 301b was determined. This enables the ability to provide more information about the basis of the maneuver list 301a, 301b to the network component NC.

The one or more of the parameters provided by the safety driving model may include a classification of the maneuvers, e.g., representing a rating of the maneuvers. Examples of the one or more parameters provided by the safety driving model may include: the rating 311a, 311b (also referred to as vehicular raring) of each maneuver of the maneuver list 301a, 301b (e.g., providing a ranking of the maneuver list 301a, 301b), e.g., regarding one or more of the following rating types: an urgency of the maneuver, a preference of the maneuver, a safety of the maneuver. As an example, the urgency of the maneuver may be determined based on the type of vehicle 100, its destination, traffic rules, an imminent collision, and/or national rules. For example, the preference of the maneuver may be determined based on routing information and/or a selected economy-driving program. For example, the safety of the maneuver may be determined based on the one or more traffic participants.

The network component NC may include one or more processors (also referred to as coordinator processors) configured to process the information provided by the vehicle 100, which will be described with reference to 305, 307, 309, The one or more coordinator processors may be configured, in 305 (also referred to as assessment determination 305), to assign an assessment $A(M_h)$ out of a plurality of assessments $(A_1, \ldots, A_v)$ to each maneuver of the maneuver list 301a, 301b. Illustratively, each maneuver may be prioritized and/or evaluated in view of each maneuver list 301a, 301b provided to the network component NC within a predetermined time frame.

For example, the assessment $A(M_h)$ may be assigned to a respective maneuver $M_h$ of the maneuver list 301a, 301b by comparing the maneuver $M_h$ to each maneuver list 301a, 301b (e.g., to each of its maneuvers) provided to the network component NC. The assessment $A(M_h)$ may reflect a result of the comparison. Illustratively, the one or more coordinator processors may be configured to determine each possible combination of two maneuvers (of the two vehicles 100) and determine, whether the combination results in a conflict (e.g., such as a collision of the two vehicles V1, V2 or not).

An example of the plurality of assessments may include a plurality of safety assessments. The plurality of safety assessments $(A_1, \ldots, A_v)$ may include a first assessment $A_1$ indicating that the maneuver is unendangered (e.g., safe and/or no conflicts was determined). For example, the plurality of safety assessments may include a second assessment $A_2$ indicating that the maneuver is endangered (e.g., unsafe and/or a conflict was determined). Optionally, the plurality of safety assessments may include a third assessment $A_3$ indicating that the maneuver is partially endangered (e.g., a potential conflict was determined). When the a third assessment is assigned, the third assessment may include context information regarding the potential of a conflict, e.g., under which circumstances conflict appears or is avoided, the likelihood of the conflict, and the like.

For example, the one or more coordinator processors may be configured to provide a list 305a of the potential combinations (also referred to as combination list 305a), and for each of the potential combinations, the assessment, e.g., safe or unsafe.

In an example, the first vehicle V1 may provide a first maneuver list 301a including a quantity of K+1 maneuvers $(M_0, M_1, \ldots, M_K)$, that is i=0, ..., K. Further, the second vehicle V2 may provide a second maneuver list 301b including a quantity of L+1 maneuver $M_j, \ldots, M_L$, that is j=0, ..., L. Optionally, the combination list 305a (exemplarily provided as tensor) may assign one or more ratings $R_{ij}$ to each of the maneuver combinations $(M_i, M_j)$, e.g., the vehicular ratings as received from the first vehicle V1 and/or second vehicle V2. In this example, the tensor $\{M_i, M_j\}$ has two dimensions, but, may in general, have N dimensions. For N dimensions, the combination list 305a may include tuples of MN).

The one or more coordinator processors may be configured to assign an assessment $A(M_h)$ to each maneuver $M_h$ (h=i or h=j) of the first maneuver list 301a and/or of the second maneuver list 301b based on a safety driving model implemented by the network component NC. For example, the first maneuver list 301a and/or of the second maneuver list 301b may be input to the safety driving model of the network component NC as input data. In response, the safety driving model of the network component NC may provide an assessment $A(M_h)$ to each maneuver $M_h$ of the input data as output data. Illustratively, the assessment $A(M_h)$ may reflect, if a maneuver $M_h$ is safe or not. Illustratively, the one or more coordinator processors may be configured to evaluate the traffic situation as indicated by the maneuver lists 301a, 301b based on its own instance of the safety driving model.

Optionally, the assessment $A(M_h)$ may be assigned based on a conflict indicator $A_{ij}$ of each maneuver combination $(M_i, M_j)$ and/or based on one or more safety ratings $R_{ij}$ of the maneuver combination $(M_i, M_j)$, e.g., each of which may be provided to the safety driving model of the network component NC as input data. The one or more safety ratings $R_{ij}$ may be provided by the first vehicle V1 and/or the second vehicle V2. Illustratively, the conflict indicator $A_{ij}$ may indicate on the level of the maneuver combinations $(M_i, M_j)$, if a maneuver combination is in conflict or not. Illustratively, one or more safety ratings may indicate from the perspective of the individual vehicle 100, if a maneuver is in conflict or not.

For example, if the maneuver combination $(M_i, M_j)$ is determined to be in conflict, the conflict indicator $A_{ij}$ may be 1, otherwise 0. Analogously, if every conflict indicator Au is zero, the assessment assigned to M1 may indicate that the M1 is safe.

Optionally, the conflict indicator $A_{ij}$ may be based on the one or more ratings $R_{11}$, e.g., indicating if or how many of the $R_{ij}$ indicate a conflict. For example, the sum of for a certain maneuver combination $(M_i, M_j)$ may be calculated, e.g., as conflict indicator. Alternatively, when the sum of $R_1$ for a certain maneuver combination $(M_i, M_j)$ is more than a threshold, may be 1, otherwise 0.

Optionally, the assessment $A(M_h)$ may be assigned based on sensor data related to each of the vehicles V1, V2. For example, the sensor data may be provided by one or more sensors of the vehicles V1, V2. Additionally or alternatively, the sensor data may be provided by one or more sensors external from the vehicles V1, V2. Examples of the type of sensor data and the one or more sensors are outlined above. For example, the sensor data may be fed to the safety driving model of the network component NC as input data, which, in response, outputs the assignment(s) as output data.

The one or more coordinator processors may be configured, in 307 (also referred to as conflict resolution 307), to select one of the maneuver combinations, e.g., the maneuver combination ($M_1$, $M_3$). For example, the one or more coordinator processors may be configured to determine, for each vehicle 100, the maneuver combination having the minimum quantity of conflicts, as described in detail later. The conflict resolution 307 is optional.

The one or more coordinator processors may be configured, in 309 (also referred to as conflict coordination 309), to negotiate the selected maneuver combination ($M_i$, $M_j$) with the two vehicles V1, V2. Therefore, the one or more coordinator processors may be configured to exchange one or more messages (also referred to as coordination handshake 309a) with each of the two vehicles V1, V2. The conflict coordination 309 is optional.

The one or more coordinator processors may be configured, in 311 (also referred to as assessment feedback 311), to transmit 315a, 315b, for each maneuver of the maneuver list 301a, 301b, the assessment 313a, 313b as assigned to the maneuver of the maneuver list 301a, 301b back to the vehicle 100 (also referred to as assessment feedback). For example, the assessment 313a, 313b as assigned to each maneuver $M_i$ of the first maneuver list 301a may be transmitted 315a to the first vehicle V1. In the case of two maneuvers, the first vehicle V1 may receive for each maneuver of the two maneuvers, a respective assessment.

In various aspects, the assessment may be send along with the full information of the maneuver list 301a, 301b, e.g., along with a copy of the maneuver list 301a, 301b as received by the network component NC. In various other aspects, the assessment may be sent along with an indicator (also referred to as maneuver indicator) for each maneuver of the maneuver list 301a, 301b, e.g., the row number. This minimizes data traffic.

In various aspects, not all assessments made have to be send back to the vehicle 100. For example, a subset of the assessments as assigned to the maneuver list 301a, 301b may be sent to the vehicle 100. For example, the subset of the assessments may, in some aspects, include only the first assessments. In another example, the subset of the assessments may include only the second assessments an optionally the third assessments. This minimizes data traffic. As the logic of the assessment transmission is defined by the respective communication protocol, the not transmitted assessments are indicative, too. Thus, the transmission may indicate, for each of the plurality of maneuvers, the assigned assessment.

For example, the third assessment may indicate that the respective maneuver was not successfully negotiated with the second vehicle V2.

The maneuvers of the maneuver list 301a, 301b, for which the assessment is transmitted to the vehicle 100, are also referred to as maneuvers proposed for the vehicle 100.

Referring back to the vehicle 100, the one or more vehicular processors 102 may be configured, in 313 (also referred to as maneuver decision), to determine a maneuver (also referred to as maneuver planned for the vehicle or to as planned maneuver) based on a safety driving model and based on the assessment feedback (also referred to as vehicular planning). Illustratively, the vehicle 100 receives assessments as feedback to sending the maneuver list 301a, 301b, and may choose one maneuver based on the assessment feedback.

As result, the vehicle 100 may perform the maneuver as planned for the vehicle 100 (also referred to as maneuver execution), e.g., taking over, maintaining the lane, changing the lane, and the like. As such, the one or more vehicular processors 102 may be configured to provide instructions to the components of the vehicle 100 (e.g., the power train) in accordance with the maneuver as planned.

The method 300 and functions described herein provide for a combination including the safety driving model of the vehicle 100 and a reservation-based maneuver coordination in order to minimize the quantity of observed dangerous situations by providing an assessment (illustratively, safety scoring) on intended maneuvers. The vehicle 100 may use this information to avoid dangerous situations, which the safety driving model may, for example, alone, not avoid in every scenario.

In the following, an illustrative example is detailed. Connected and automated vehicles 100 (CAVs) may be configured to communicate with a central coordinating entity NC (also referred to as coordinator), e.g., a roadside unit (RSU) or a leader in a vehicular ad-hoc network. If a vehicle 100 intends to perform a set of driving actions (that is a maneuver) that modifies its current state, e.g., change lane, takeover, break, etc., it notifies the vehicle maneuver intent, together with its driving parameters to the coordinator. The coordinator poses an environmental model, derived from own or third-party sensor sources. The network component NC receives maneuver notifications, and applies an safety driving model on the entire potential maneuvers over all spanned reaction time cycles to evaluate, whether a dangerous situation may be reached. As the vehicles V1, V2 share their intended maneuvers as potential maneuvers to the network component NC, the network component NC may evaluate a reduced space of more likely maneuvers faster. In case the network component NC detects dangerous situations, the network component NC may evaluate, whether a coordinated maneuver is possible (e.g., timely) according to other optimization objectives such as traffic congestion, vehicle priority, fairness, etc. This coordination may include an agreement on risks, and thus on changes to the driving parameters for a particular period of time on the involved vehicles. Furthermore, method 300 provides workloads at the edge/cloud infrastructure that may provide computation resources to aid automated vehicles with extra information on the safety of their intended maneuvers. The coordinator may reply to each vehicle 100 by providing the assessments as quantified 'maneuver safety level', e.g., indicating, if the requested maneuvers are free from potential collisions, if other vehicles agreed to respect the intended maneuver, or if caution is recommended. As result, each vehicle is free to decide, which maneuver to execute based on the assessments (illustratively, scoring information) to avoid or be more wary of a planned maneuver (e.g., trajectory) and/or compare it to a local planning module with own predictions.

The method 300 may provide for a prediction in coordinated scenarios. The method 300 may extend the application of safety driving models at two co-existing levels, allowing the application of safety driving models for autonomy on each vehicle 100 and the inclusion of a new layer for prediction at the network component NC as coordinating actor (also referred to as coordinator) to provide a safety assessment for potential maneuver combinations.

Figure 4:
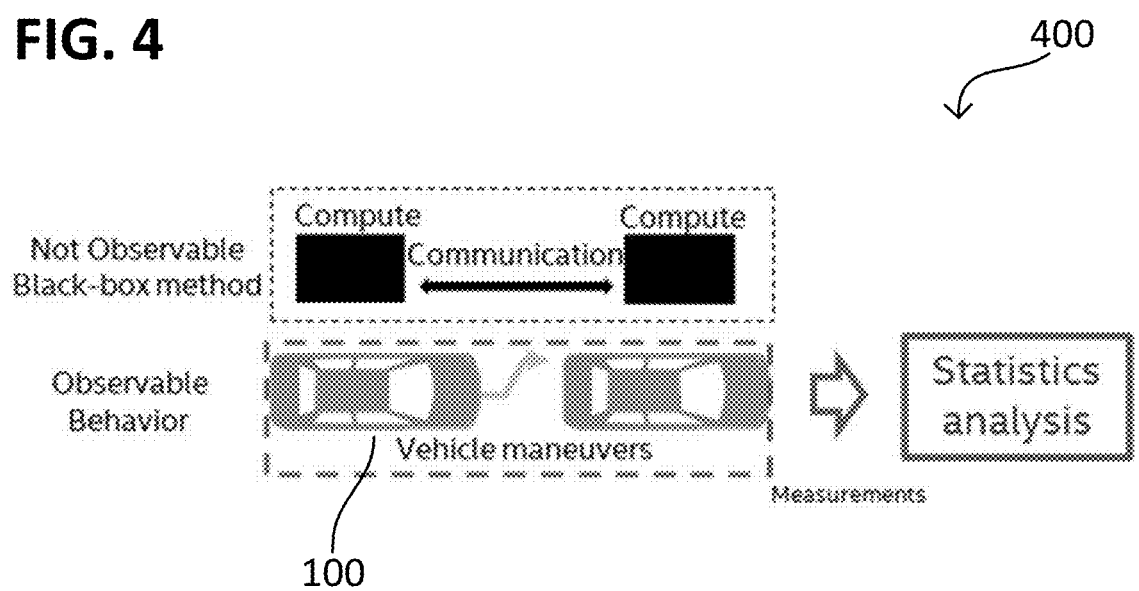
FIG. 4 shows the exemplary method according to various aspects of the disclosure in a schematic flow diagram.

FIG. 4 shows the exemplary method 300 according to various aspects 400 as implemented by the first vehicle V1 and the network component NC. The implementation of method 300 may be revealed by reverse-engineering. For example, the wireless communication exchange between the vehicle 100 and the network component NC in an open or standardized system may be analyzed. If the exchanged messages include maneuver lists and safety assessments (as described above), the method 300 is implemented.

The implementation of method 300 may also be realized in a black-box system, e.g., even semi-automatically, through a "law of entropy analysis". Assuming, for example, that the only observable is the maneuver of vehicles 100, the maneuver statistics may be identified from the observation of the vehicle behavior. A high presence of high risk maneuver combinations that lack safety driving model corrective actions (to get out of a hazard situation) but unlikely to have evolved in this way by mere chance of local decisions strongly provides evidence of the implementation of the method 300. For example, the likelihood of maneuvers sequence's success without method 300 may be compared to the likelihood of maneuvers sequence's success with method 300 and/or maneuver sequence compliance with a safety driving model.

Also the implementation of method 300 may be reflected by the documentation of a proprietary or public V2X-system, in which a maneuver safety assessment is provided by an external coordinating entity. For example, the documentation may stipulate the sharing of vehicle driving parameters for the purpose of method 300, e.g., using a safety driving model for predicted behaviors based on shared vehicle maneuver intentions.

Figure 5:
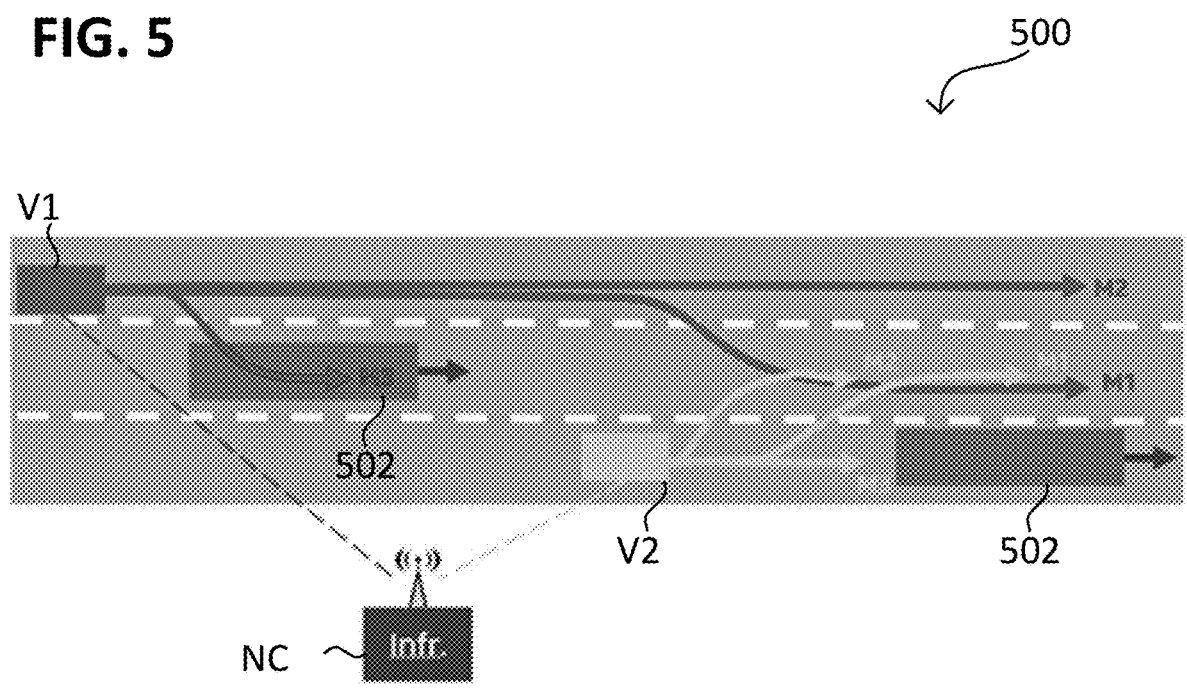
FIG. 5 shows a scenario of the method according to various aspects of the disclosure in a schematic top view.

FIG. 5 shows an exemplary scenario 500 for the method 300 according to various aspects as implemented by various components, namely the first vehicle V1, the second vehicle V2, and the network component NC. Obstructions 502 represent traffic participants, e.g., slow trucks or busses.

Scenario 500 reflects a potential conflicting situation, in which the method 300 provides for an improved resolution by applying a safety driving model in a prediction layer, e.g., to improve the safety of maneuver decisions and improve the driving experience.

The first vehicle V1 may be a high-priority vehicle (e.g., an ambulance). The first vehicle V1 prefers to perform an overtake maneuver, which is determined having the alternatives M1 to M3. As an example, M1 indicates a less risky overtake maneuver as a first potential maneuver, M2 indicates a risky overtake maneuver as a second potential maneuver, and M3 indicates a braking maneuver as a third potential maneuver. The second vehicle V2 may be a fast moving vehicle. The second vehicle V2 may prefer to incorporate to a lower speed lane as a first potential maneuver M1, and has determined two alternatives thereto, namely to keep in the same lane at high speed as a second potential maneuver M2, and to aggressively break and emergently incorporate as a third potential maneuver M3.

For example, the first vehicle V1 intends to fall back to the low speed lane, while the second vehicle V2 intends to take over and move to the same lane.

By the safety driving model of the individual vehicles V1, V2, the first vehicle V1 cannot identify its preferred maneuver M1 as being unsafe until approaching the decision deadline, due to the visibility occlusion.

According to the method 300, both vehicles V1, V2 may request to the network component NC to evaluate the safety of their intended maneuvers M1 to M3 (also referred to as potential maneuvers). The network component NC may inform, if a consensus has been achieved or not, and provide the assessments as a "safety level evaluation" (also referred to as safety assessment) of the potential maneuvers based on the received requests, road status and coordination results.

The method 300 may provide vehicles with a more reliable safety assessment of intended maneuvers, by the use of a coordinating entity.

According to various aspects, a more complete, or global view of the environment compared to individual vehicles V1, V2 may be provided, e.g., an RSU with road side sensor carefully placed, or a selected moving vehicle with a privileged view or equipped with superior sensors.

According to various aspects, the computational capability to perform a safety assessment for multiple vehicles enables to reduce the handshake overhead in terms of latency of a distributed approach.

According to various aspects, an RSU may provide High Performance Computing (HPC) server capabilities to implement the network component NC. A trust relationship (also referred to as registration) to moving vehicles V1, V2, e.g. through established Public-Key-Infrastructure (PKI), or symmetric key approaches for V2X-services may be provided.

According to various aspects, the capability to communicate with the moving vehicles V1, V2, e.g., to seek an agreement for conflicting maneuvers, may be provided via a cellular V2X-PC5 interface (also referred to as LTE-V2X, that is Long-term-evolution-V2X).

According to various aspects, the message exchange between the vehicle 100 and the network component NC, e.g., for providing a coordinated safety assessment, may be implemented as a service, in which the pre-provisioning of a root of trust for all participating vehicles may be implemented without invasive changes to the existing communication and computing capabilities of the participating components.

The first vehicle V1 and/or the second vehicle V2 may select one of the maneuvers M1 to M3 as a planed maneuver based on the assessment feedback and perform changes of the velocity and/or direction of movement according to the planed maneuver (also referred to as maneuver execution).

Figure 6:
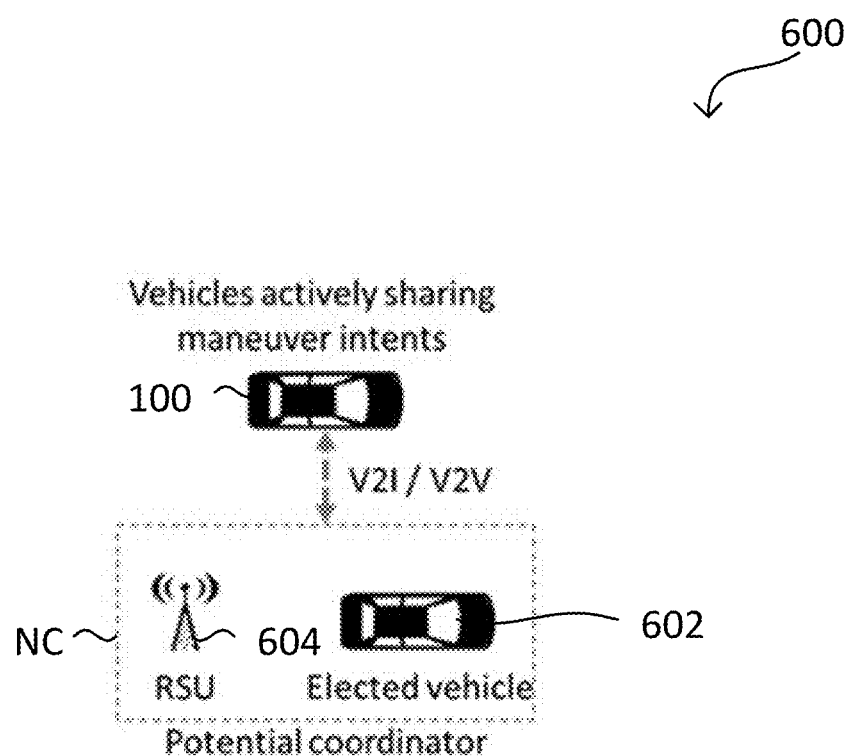
FIG. 6 shows an exemplarily implementation of the method according to various aspects of the disclosure in a schematic communication diagram.

FIG. 6 shows an exemplarily implementation 600 of the method 300 according to various aspects. The network component NC may be implemented by a stationary component 604 (also referred to as stationary network component 604), such as an RSU 604 or other roadside infrastructure. Additionally or alternatively, the network component NC may be implemented by a non-stationary component 602 (also referred to as non-stationary network component 602), such as a vehicle 602 from the group of N vehicles (also referred to as elected vehicle 602).

The messages exchanged between the vehicle 100 and the network component NC may be transmitted in accordance with a mobile network communication protocol. For example, the messages exchanged between the vehicle 100 an the stationary network component 604 may be transmitted via a Vehicle-to-Infrastructure (V2I) communication protocol. For example, the messages exchanged between the vehicle 100 and the non-stationary network component 602 may be transmitted via a V2V-communication protocol.

As an example of implementation 600, a system may be provided including the group of N vehicles, and optionally one or more stationary components (e.g., RSU or other roadside infrastructure). The component of the system that implements the network component (also referred to as coordinator) and the group of N vehicles may be registered by the system, e.g., before the potential maneuvers are shared in 303. In case, the coordinator is implemented by the RSU, the RSU can be unambiguously selected, and the identity and mutual authentication may use the PKI infrastructure of the V2X-communication protocol. In case, the coordinator is selected ad-hoc, the method may include a leader selection protocol. According to the leader selection protocol, the vehicle with a privileged position and/or speed, and/or the vehicle with an enhanced sensor and/or computation equipment may be selected as coordinator.

Once the coordinator is determined, the group of N vehicles may be registered by the coordinator, for example, to increase the maneuver prediction accuracy during silent periods. To exemplify, a registered vehicle 100 may be assumed to keep its current state (e.g., without changing the lane, speed and/or direction of movement), if the registered vehicle 100 is not sharing the maneuver list 301a, 301b (or is not indicating to determine one or more potential maneuvers to the coordinator). An exemplarily message architecture is detailed herein later.

Figure 7:
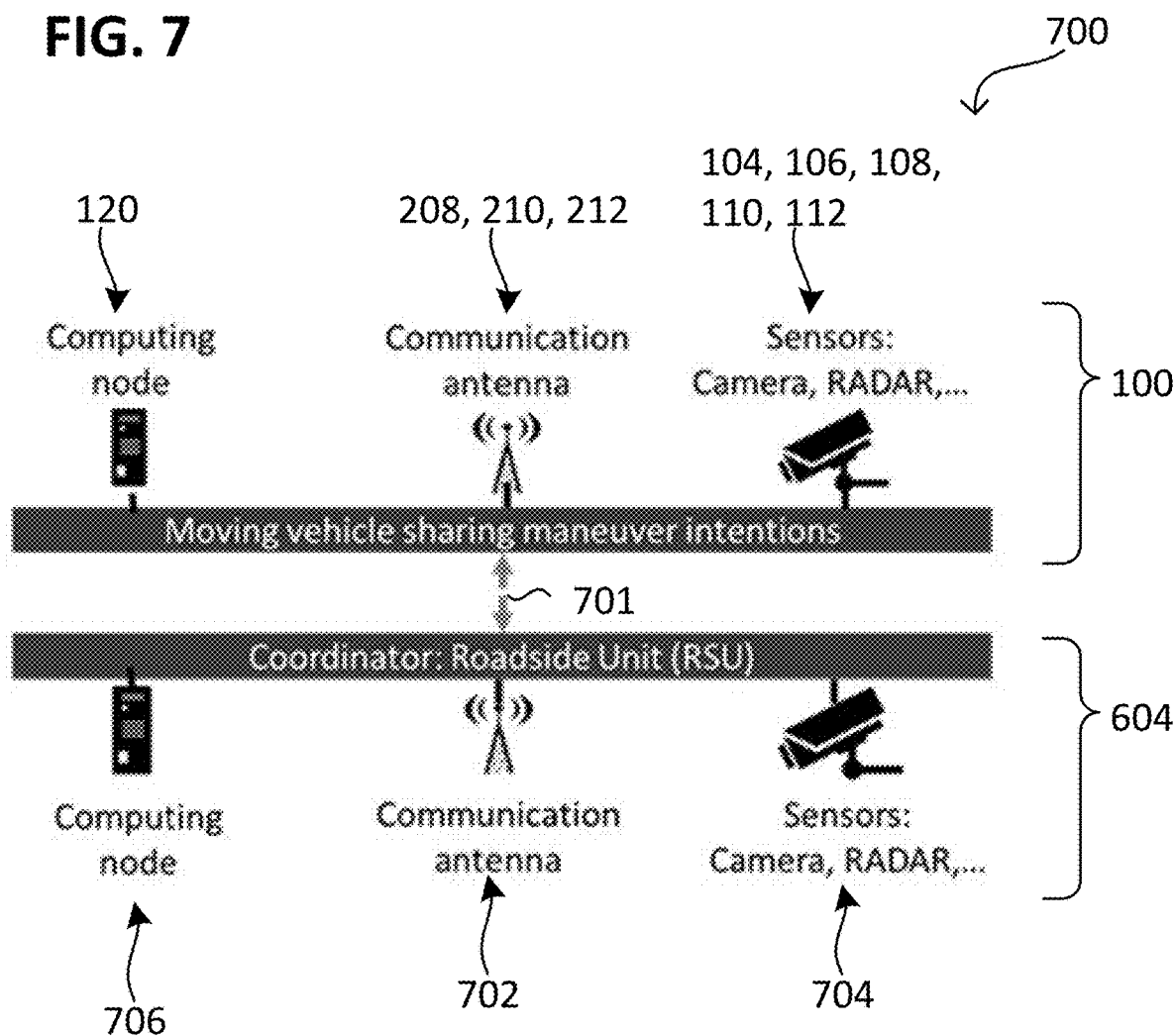
FIG. 7 shows an exemplarily implementation of the method according to various aspects of the disclosure in a schematic communication diagram.

FIG. 7 shows an exemplarily implementation 700 of the method 300 according to various aspects. The aspects outlined herein for the stationary network component 604 may apply analogously to other network components NC, e.g., the non-stationary network component 602.

The stationary network component 604 and the vehicle 100 may exchange one or more messages for implementing the method 300 (also referred to as message exchange 701). The message exchange 701 may be in accordance with a mobile network communication protocol, e.g., a cellular communication protocol. The message exchange 701 between the vehicle 100 an the stationary network component 604 may be transmitted by one or more wireless transceivers 208, 210, 212 of the vehicle 100 and one or more wireless transceivers 702 of the stationary network component 604. The one or more wireless transceivers of the stationary network component 604 and/or the vehicle 100 may be configured (e.g., on the logical level) in accordance with the mobile network communication protocol.

For example, the maneuver list 301a, 301b may be sent from the vehicle 100 to the stationary network component 604 via the message exchange 701. For example, the vehicle 100 and the stationary network component 604 may perform the coordination handshake 309a via the message exchange 701. For example, the one or more assessments 313a, 313b as assigned to the maneuver list 301a, 301b may be sent from the stationary network component 604 to the vehicle 100.

The stationary network component 604 may include the one or more external sensors 704 for providing sensor data (also referred to as external sensor data). As an example, the external sensor data may be provided to the vehicle 100 and may be fed as input parameter to the safety driving model of the vehicle 100, e.g., in 301. As an example, the external sensor data may be fed as input parameter to the safety driving model of the stationary network component 604, e.g., in 305.

The vehicle 100 may include the one or more vehicular sensors 104, 106, 108, 110, 112 for providing sensor data (also referred to as vehicular sensor data). As an example, the vehicular sensor data may be provided to the stationary network component 604 and may be fed as input data to the safety driving model of the stationary network component 604, e.g., in 305. As an example, the vehicular sensor data may be fed as input data to the safety driving model of the vehicle 100, e.g., in 301.

Further, the vehicle 100 may include one or more vehicular processors 102 configured to generate a first message to a stationary network component 604 (also referred to as first vehicular message). The first message may include a maneuver list 301a (including a first plurality of potential maneuvers). The maneuver list 301a may be determined previously. For example, the one or more vehicular processors 102 may implement the safety driving model of the vehicle 100 (also referred to as vehicular safety driving model) of the vehicle 100 and be configured to determine the maneuver list 301a based on the vehicular safety driving model and optionally further based on the vehicular sensor data and/or the external sensor data.

The one or more vehicular processors 102 may be further configured to determine a maneuver planned for the vehicle 100 based on the vehicular safety driving model and based on a second message 315a, 315b from the stationary network component 604 (also referred to as coordinator message). The coordinator message 315a, 315b may include, for at one or more maneuver $M_i$ of the first maneuver list 301a, the assessments $A(M_i)$ as assigned to the maneuver $M_i$ (e.g., also referred to as classifying one or more maneuvers).

The above may apply to each of the two vehicles V1, V2, thus providing a respective first maneuver list 301a and second maneuver list 301b and sending a respective first vehicular message including the first maneuver list 301a and second vehicular message including the second maneuver list 301b.

The stationary network component 604 may include one or more coordinator processors 706. The one or more coordinator processors 706 may be configured to assign the assessment $A(M_i)$ to each maneuver $M_i$ of the first maneuver list 301a (also referred to as classify each of a plurality of first maneuvers) received via the first vehicular message 303a from the first vehicle V1. The one or more coordinator processors 706 may be further configured to assign the assessment $A(M_j)$ to each maneuver $M_j$ of the second maneuver list 301b (also referred to as classify each of a plurality of second maneuvers) received via the second vehicular message 303b from the second vehicle V2.

The classification of the first maneuver list 301a may be based on the information received from both vehicles V1, V2, e.g., the first maneuver list 301a and the second maneuver list 301b, and optionally driving parameter from the first vehicle V1 and/or driving parameter from the second vehicle V2. The classification of the second maneuver list 301b may be based on the information received from both vehicles V1, V2, e.g., the first maneuver list 301a and the second maneuver list 301b, and optionally driving parameter from the first vehicle V1 and/or driving parameter from the second vehicle V2.

The one or more coordinator processors may be configured to provide 315a the result of the classification of the first maneuver list 301a (e.g., only) to the first vehicle V1 (also referred to as first assessment feedback). The one or more coordinator processors may be further configured to provide 315b the result of the classification of the second maneuver list 301b (e.g., only) to the second vehicle V2 (also referred to as second assessment feedback).

As an example of the implementation 700, one or more actors may include the vehicle 100 equipped with computing, sensing and communication resources, and a coordinator placed at the road (either an RSU or an elected vehicle).

Figure 8:
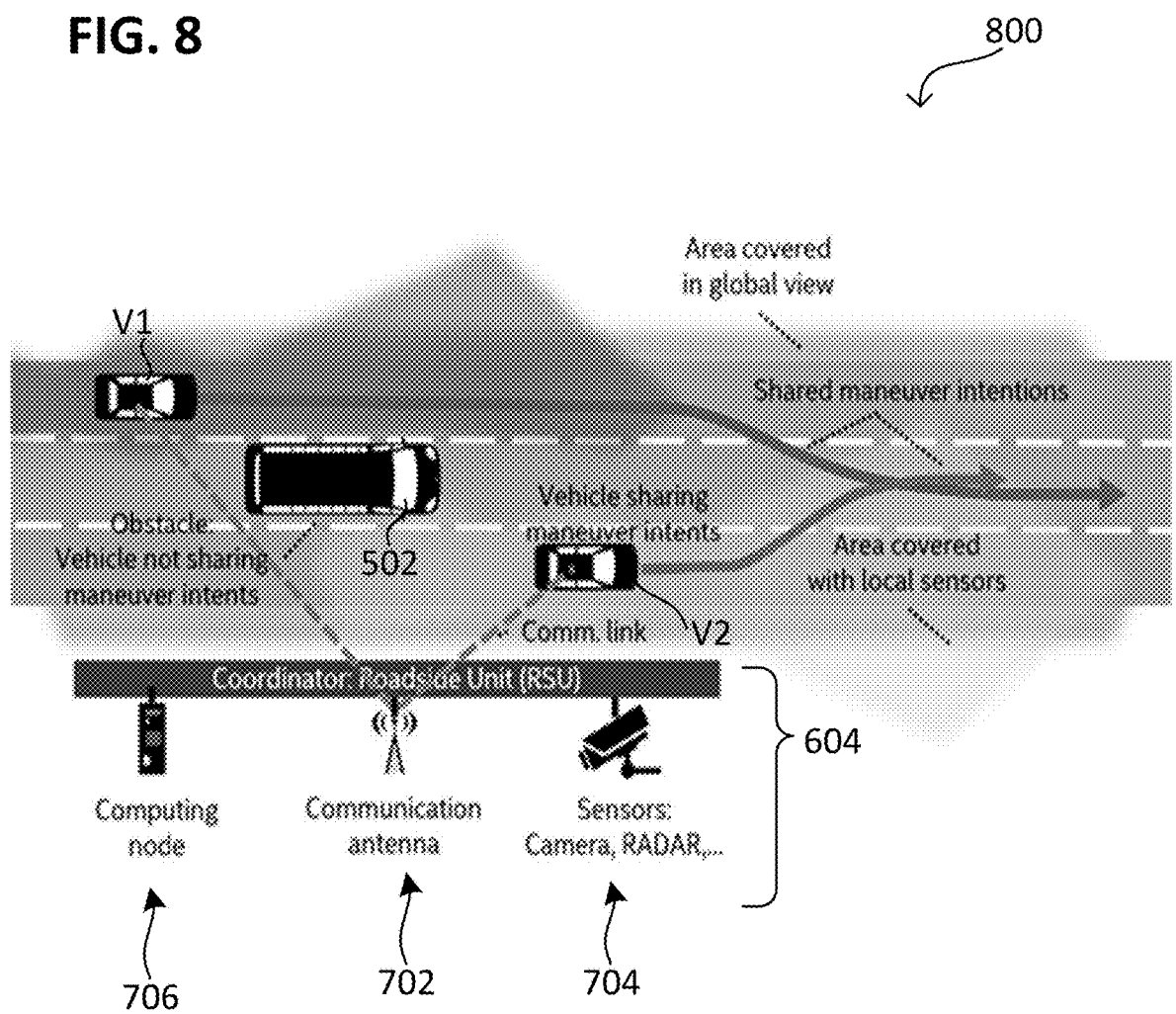
FIG. 8 shows a system as exemplarily implementation of the method according to various aspects of the disclosure in a schematic top view.

FIG. 8 shows a system 800 as exemplarily implementation of the method 300 according to various aspects. The system 800 includes the network component NC and the group of N vehicles. Each vehicle 100 of the group of N vehicles may be registered by the system 800, e.g., by the stationary network component 604.

The aspects outlined for the stationary network component 604 may apply analogously to types of other network components NC, e.g., to the non-stationary network component 602. The aspects of the group of N vehicles are described in the following with reference to the first vehicle V1 and the second vehicle V2 as representative for two vehicles of the group of N vehicles.

In 301, each of the registered vehicles V1, V2 may be configured to continually compute a set of potential maneuvers, and to locally evaluate the safety of each potential maneuver based on a vehicular safety driving model, e.g., through a predicted time frame across the entire maneuver.

In 303, each of the registered vehicles V1, V2 may associate the priority and the safety metric to each of the potential maneuvers, and shares this information with the stationary network component 604 (illustratively, providing the coordinator with information about intended maneuvers).

In 305, the stationary network component 604 may be configured to receive all potential maneuvers within a predetermined time frame, and to globally determine the safety of each combination of the maneuvers in their order or priority using prediction and a safety driving model implemented by the stationary network component 604, e.g., throughout the entire maneuver duration.

The stationary network component 604 may be configured to, in 307, determine timing feasibility of this coordination, e.g., if a high priority combination is identified to be safe and/or only if coordination would take place.

The stationary network component 604 may be configured to, in 309, perform the coordination handshake 309a. In some aspects, the stationary network component 604 may be configured to perform the coordination handshake 309a only if the coordination is necessary (e.g., as a result of logic) and/or timely possible. By use of the coordination handshake 309a, each of the vehicles V1, V2 may accept or reject their respective potential maneuvers, so that the high priority combination of maneuvers can be finally determined to be safe or not.

The stationary network component 604 may be configured to, in 311, communicate the safety assessment(s) $A(M_h)$ (illustratively, reflecting the maneuver safety) as a result to each of the registered vehicles V1, V2 (e.g., with or without the coordination handshake).

In 313, each of the registered vehicles V1, V2 determines one of the potential maneuvers ($M_i$ or $M_j$) as maneuver planned for the respective vehicle based on the safety assessment(s) $A(M_h)$ received from the coordinator 604.

In the following, more detailed examples for the implementation of the method 300 are provided.

Figure 9A:
FIGS. 9A and 9B each show an exemplarily maneuver list of the method according to various aspects of the disclosure in schematic table diagrams.
Figure 9B:

FIGS. 9A 9B show each an exemplarily maneuver list 301a, 301b for the method 300 according to various aspects, as unsorted list 900a and as list sorted by preference 900b.

The first maneuver list 301a may include a set of maneuvers $\{M_i\}$ with i=0, 1, 2, 3, . . . , K, so that the first maneuver list 301a includes a quantity of K+1 maneuvers ($M_0$, . . . , $M_i$, . . . , $M_K$). The second maneuver list 301b may include a set of maneuvers $\{M_j\}$ with j=0, 1, 2, 3, . . . , P, so that the second maneuver list 301b includes a quantity of P+1 maneuvers ($M_0$, . . . , $M_j$, . . . , $M_P$).

Each maneuver $M_h$ (h=i or h=j) may include one or more of semantic actions that may potentially be performed by a vehicle. Examples for a semantic action may include: lane change left, lane change right, turn left, turns right, stop, break, accelerate, do nothing (e.g., for a certain time frame). Thus, a maneuver $M_h$ may be a minor complex maneuver including one semantic action (e.g., turning left at an intersection or changing the velocity) or may be a more complex maneuver $M_h$ including multiple semantic actions (e.g., overtaking with a change in the velocity).

In the present exemplarily maneuver list, $M_0$ denotes the maneuver "do nothing", i.e. maintain current velocity, orientation, etc. This maneuver $M_0$ may be regarded as default case and, thus, may but don't have to be part of the maneuver list 301a, 301b, e.g., if no other maneuver is contemplated.

For example, a vehicle 100, which is registered to the network component NC but does not provide any maneuver list 301a, 301b in 303, is assumed to follow the present trajectory during silence periods. If the vehicle 100 determines at least one maneuver that changes the state of the vehicle (illustratively, a further potential maneuver is considered), $M_0$ may be an element of the maneuver list 301a, 301b.

In 301, each registered vehicle V1, V2 generates a maneuver list 301a, 301b. For example, all possible actions with respect to the perceived environment are collected by the vehicle, and sorted by evaluating one or more of the two following hierarchical criteria (also referred to as rating types).

The first hierarchical criterion may include the rating provided by the vehicular safety driving model indicating the maneuver safety (also referred to as safety rating). For example, the safety rating may be based on the perceived environment from the one or more vehicular sensors (also referred to as onboard sensors). The safety rating provided by the vehicular safety driving model may be a binary value, e.g., 1 for safe and 0 for unsafe).

The second hierarchical criterion may include a maneuver preference as a rating, for example, the order of maneuvers that best fit the current needs, i.e. in terms of the traveling goals, targeted driving comfort, etc. The result is a prioritization of the maneuver list 301a, 301b with integer labels (e.g., the higher, the less the priority is, e.g., 1 for highest preference).

Figure 10:
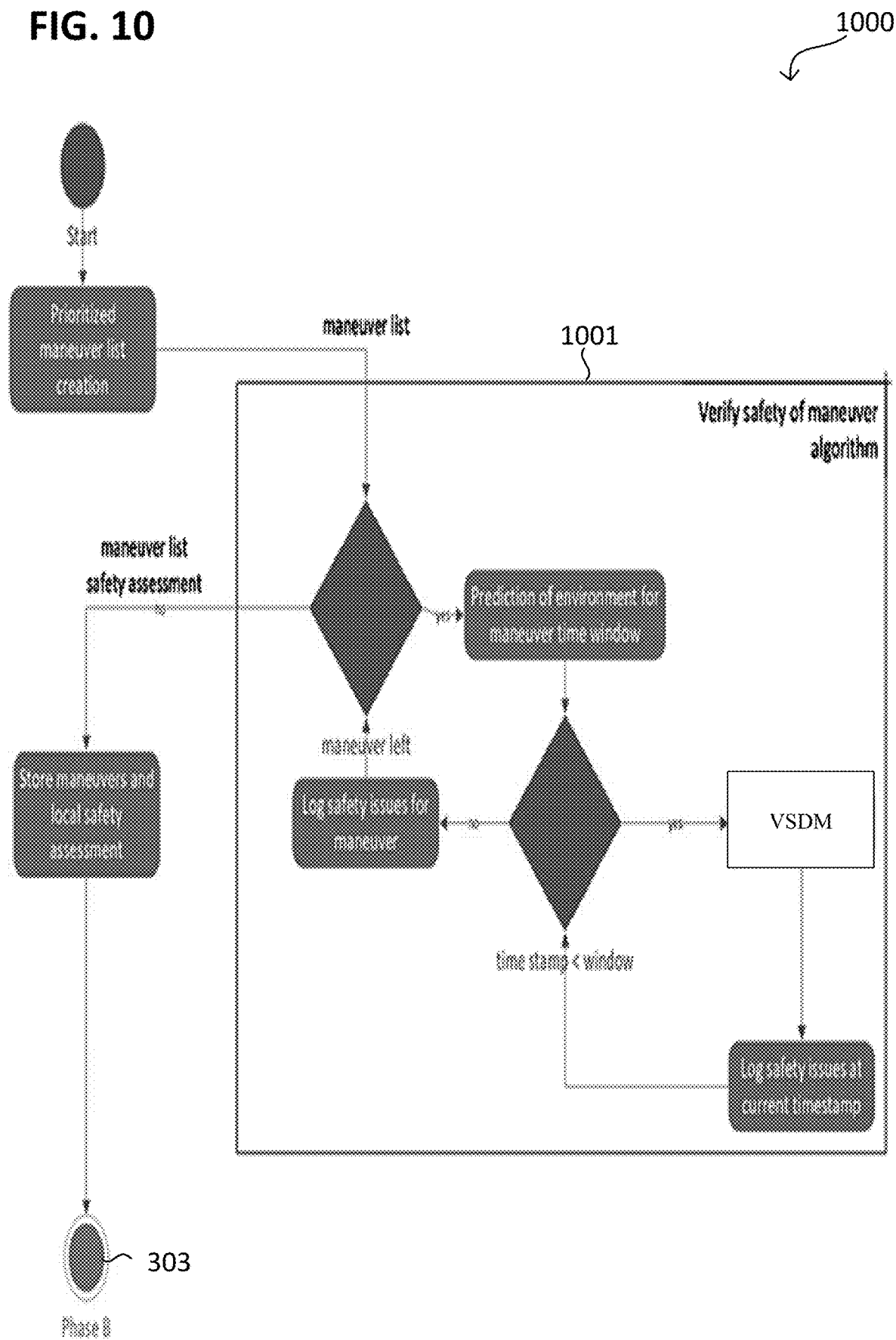
FIG. 10 shows an exemplarily implementation of the maneuver determination according to various aspects of the disclosure in a schematic flow diagram.

FIG. 10 shows an exemplarily implementation 1000 of the maneuver determination 301 according to various aspects.

The safety driving model may be configured to determine the interplay of all sensed objects indicated by the sensor data. For each of the potential maneuvers, the interplay of all sensed objects may be determined throughout the predicted course of the potential maneuver as exemplarily shown with respect to algorithm 1001. If a pair of two objects states become critical (e.g., intersecting in terms of lateral and longitudinal distances), then the potential maneuver is determined as being unsafe.

In case the vehicle 100 does not implement the network component NC, the vehicle is not provided with the potential maneuvers of vehicle-external traffic participants. In this case, the rating 311a, 311b (e.g., a vehicular safety driving model rating) is performed with naive predictions about the perceived environment. For example, the vehicular safety driving model (VSDM) may be configured to determine that each vehicle-external traffic participant is performing the default maneuver ($M_0$), if not provided with information indicating otherwise.

In case, the vehicle 602 implements the network component NC, the vehicle is provided with the potential maneuvers of one or more vehicle-external traffic participants, e.g., of one or more second vehicles V2. In this case, the rating 311a, 311b is performed based on the potential maneuvers provided by the one or more vehicle-external traffic participants.

In the individual maneuver list 301a, 301b of each vehicle, an vehicular safety driving model rating may be performed for the preferred maneuvers using naive predictions about the respective environment. The coordinator (e.g. the infrastructure) on the other hand, may be provided with all available maneuver lists 301a, 301b, e.g., as shared by the group of N vehicles. As result, the coordinator may be provided with a much broader base of information about the present scenario. The coordinator may perform a further layer of safety driving model assessment from a more global (e.g., external) viewpoint. The global viewpoint may be closer to a complete viewpoint than the respective vehicular safety driving model ratings, e.g., as the coordinator considers the potential maneuvers of multiple vehicles and may identify imminent conflicts.

FIG. 11 shows an exemplarily message architecture 1100 according to various aspects. The vehicle 100 may transmit the maneuver list 301a, 301b via a message in accordance with the message architecture 1100. The message may include a header to include the identity (e.g. pseudonym) and physical location of the vehicle 100, a time stamp, and a token indicating, if the vehicle 100 will keep sharing its maneuver intentions.

The network component NC may be configured to register the vehicle 100 as a sharing vehicle, if the token indicates so. Further, the network component NC may be configured to remove the vehicle from the state as sharing vehicle, e.g., once a timeout is reached before a corroborating token is received, or if the vehicle 100 explicitly states its opt-out via a subsequent token.

Optionally, the maneuver list 301a, 301b may include the driving parameter of the vehicle 100, e.g., included by the message sent to the network component NC.

FIG. 12 shows an exemplary implementation 1200 of method 300 according to various aspects, e.g., implemented by various components. The exemplary implementation 1200 may include the assessment determination 305 based on information about one or more surrounding vehicles, that are registered as a sharing vehicle (also referred to as sharing vehicle) or not registered as a sharing vehicle (also referred to as non-sharing vehicle). The surrounding vehicles (also referred to as vehicles in the vicinity of the vehicle 100) may be provided by a list 1201 of vehicles and positions of the surrounding vehicles.

Each sharing vehicle 100 may be configured to send the maneuver list 301a, 301b via the first vehicular message 1203 to the coordinator.

The safety driving model 1205 of the coordinator may be configured to determine a level of safety of each maneuver of the maneuver list 301a, 301b. The level of safety may be determined based on the information about the surrounding vehicles. For example, the information about the one or more surrounding vehicles may be provided by the sharing vehicle(s) 100, e.g., by sensor data used as input data of the vehicular safety driving model. For example, the information about the surrounding vehicles may be provided by one or more RSUs, e.g., by sensor data provided by the one or more RSUs.

The one or more coordinator processors may be configured to assign the assessment $A(M_h)$ to each maneuver $M_h$ of the maneuver list 301a, 301b based on the level of safety.

The information about the one or more surrounding vehicles may include a prediction of a maneuver for each of the one or more surrounding vehicles (also referred to as predicted maneuver). The predicted maneuver may, in some aspects, be determined for the non-sharing vehicles (e.g., vehicles which do not share potential maneuvers). To reduce the computational costs, the predicted maneuver may be determined for only the non-sharing vehicles according to at least one aspect. For example, a filter may be applied to the list of all present vehicles, wherein the filter removes the vehicles that are registered as sharing vehicle from the list of vehicles 1201.

The prediction of a maneuver may be based on sensor data provided by the one or more sensors of one or more sharing vehicles. In the case the coordinator is a selected vehicle 602 implementing the network component NC, the prediction of a maneuver be further based on sensor data provided by the one or more sensors of the selected vehicle 602. The more sensor data that is used, the more robust the prediction of the maneuver may be (illustratively, by using multiple viewpoints).

According to the implementation 1200, a high level flow of the prediction of a maneuver of one or more non-sharing vehicles (that do not share their intentions with the coordinator) may be provided. Illustratively, each of the vehicles may operate as a sensor data source, as they are able to provide information from different viewpoints. Since the prediction of a maneuver is an action classification problem, the temporal information may be used in addition to the spatial information. For the tracked vehicles, spatio-temporal features may be extracted in several ways, such as by applying a convolutional neural network (e.g. 3D-CNN) to short video clips or a recurrent neural network to the extracted features from these videos.

After computing the maneuver scores, a fusion may be applied using all available scores for each tracked non-sharing vehicle. Subsequently, the resulting information may be input to the safety driving model of the coordinator, e.g., together with the maneuver list 301a, 301b of one or more sharing vehicle 100. The safety driving model of the coordinator may provide a verification of the safety of the maneuver(s) for all road participants.

The safety driving model of the coordinator may be implemented analogously to FIG. 10.

Figure 13:
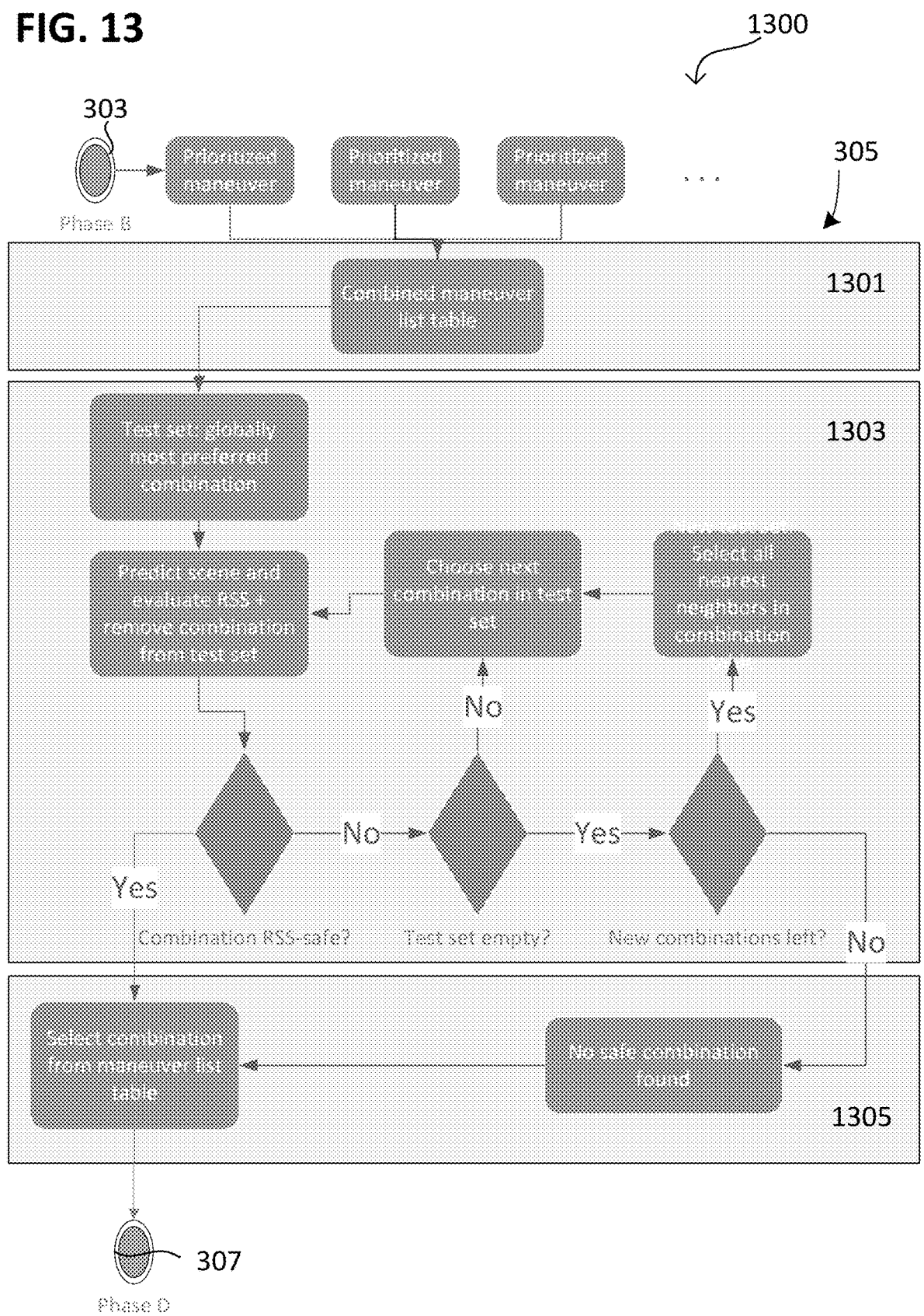
FIG. 13 shows an exemplary implementation of the assessment determination according to various aspects of the disclosure in a schematic flow diagram.

FIG. 13 shows an exemplary implementation 1300 of the assessment determination 305 according to various aspects.

The assessment(s) $A(M_h)$ determined by the one or more one or more coordinator processors may represent the safety from the perspective of the coordinator.

The one or more coordinator processors may be configured to, within a predetermined maneuver time frame, correlate the received maneuver lists 301a, 301b in 1301 (also referred to as maneuver correlation 1301). As an example, the received maneuver lists 301a, 301b may be projected (e.g., sorted with respect to vehicular safety driving model and/or to priority by respective vehicles in 301) into a tensor $\{M_i, M_j\}$ (also referred to as combination tensor). The output is a N-dimensional combination tensor with one or more entries per dimension. For example, the combination tensor may include $\Pi = _{n=1}^{N} |\{M^{(i)}\}|$ entries, where $\{M^{(i)}\}$ is the maneuver list of the vehicle having the number i, and N denotes the quantity of vehicles participating in the scenario (also referred to as scene), e.g., registered by the system.

The one or more coordinator processors may be configured to iterate, in 1303 (also referred to as maneuver combination assessment 1303), through the combination tensor starting from the globally most preferred combination (top left entry in the following exemplary combination table), and determine the global safety level for the respective combination during the maneuver time frame, e.g., based on a predicted environment model. The predicted environment model may combine the potential maneuvers and optionally the predicted maneuvers as outlined for the non-sharing vehicles above.

In 1305 (also referred to as maneuver combination selection 1305), the one or more coordinator processors may be configured to selected the maneuver combination and optionally abort the iteration, e.g., once a safe maneuver combination is identified. This enhances computational efficiency.

Figure 14:
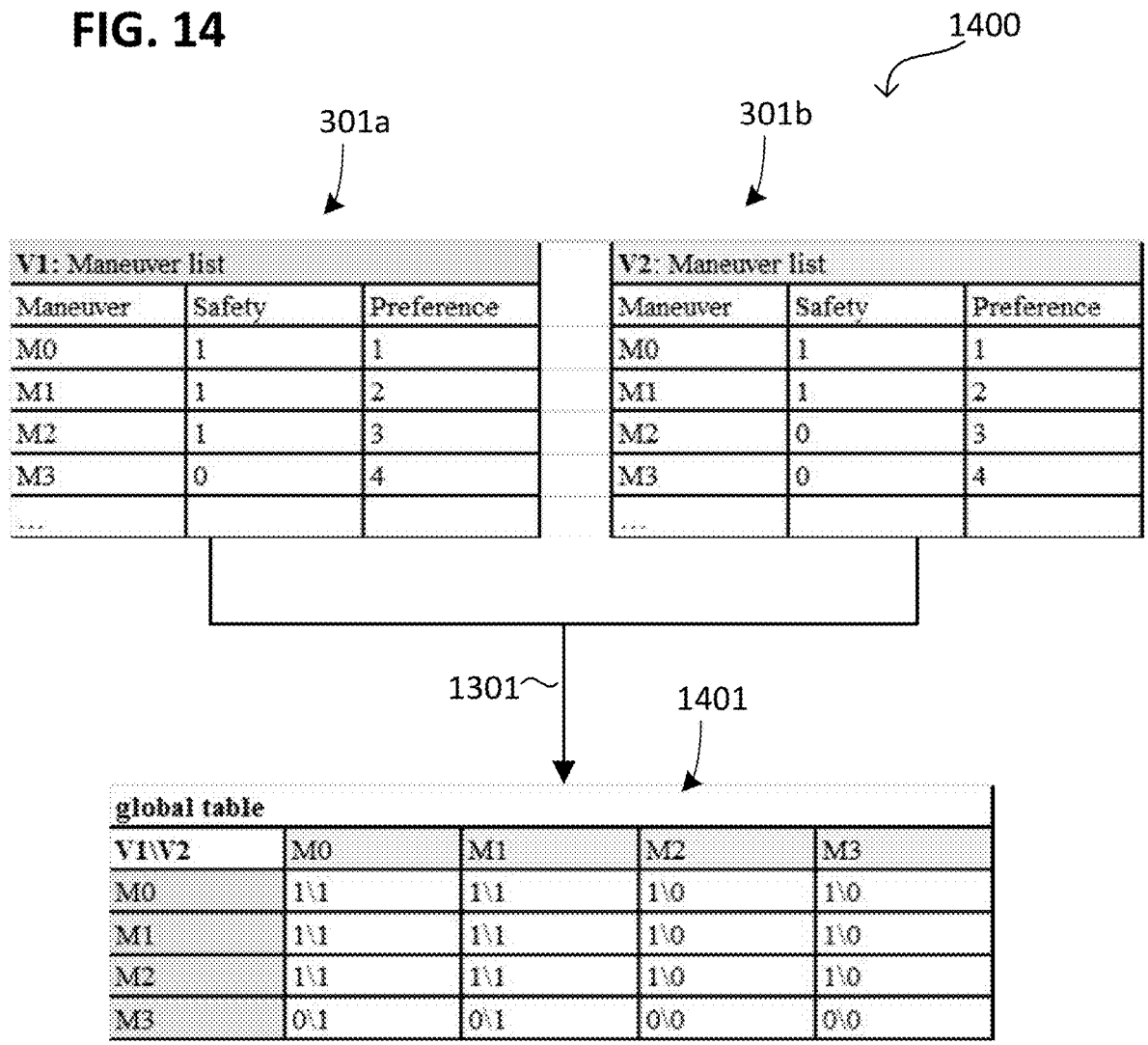
FIG. 14 shows an exemplary implementation of the maneuver correlation according to various aspects of the disclosure in a schematic flow diagram.

FIG. 14 shows an exemplary implementation 1400 of the maneuver correlation 1301 according to various aspects. As result of the maneuver correlation 1301 for the two vehicles V1, V2, a two dimensional combination tensor 1401 (that is, a combination table) may be obtained. For example, the maneuver list 301a, 301b of the two vehicles V1, V2 may be projected 1301 to the combination tensor 1401. The combination tensor 1401 may reference, in a first component, the potential maneuvers of the first maneuver list 301a, and, in a second component, the potential maneuvers of the second maneuver list 301b. As entry, combination tensor 1401 may include one or more vehicular ratings 311a, 311b of each maneuver of the first maneuver list 301a and the second maneuver list 301b. For example, the combination tensor 1401 may include one or more ratings of the following rating types: an urgency of the maneuver, a preference of the maneuver, a safety of the maneuver.

The exemplary combination tensor 1401 may be understood as a representative illustration of the information about the maneuver combinations $\{M_i, M_j\}$. The information about the maneuver combinations $\{M_i, M_j\}$ may also be formulated otherwise.

Figure 15:
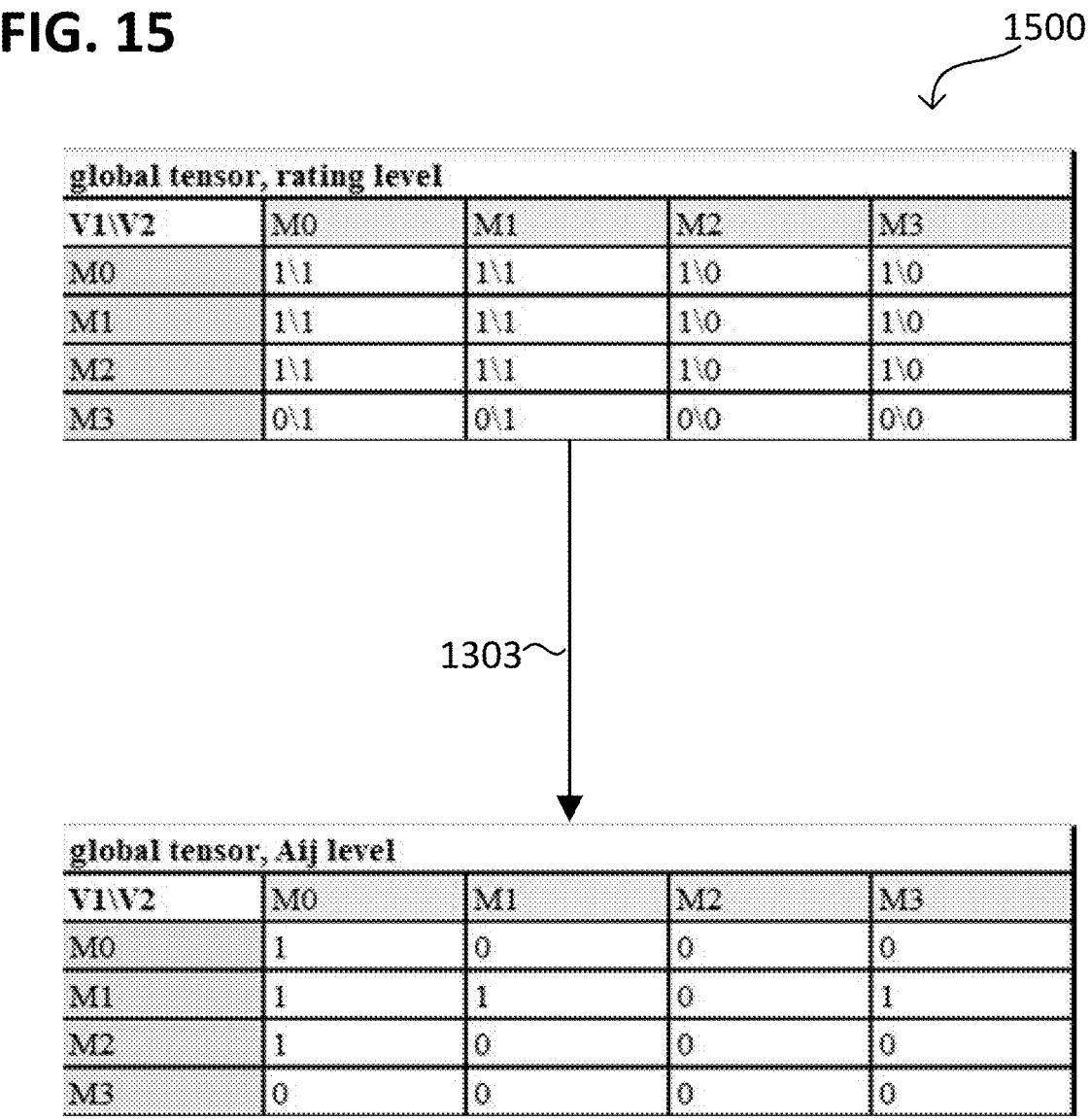
FIG. 15 shows an exemplary implementation of the maneuver combination assessment according to various aspects of the disclosure in a schematic flow diagram.

FIG. 15 shows an exemplary implementation 1500 of the maneuver combination assessment 1303 according to various aspects, illustrating the combination tensor 1401 on the rating level 1501 and on the conflict indicator level 1503. The one or more coordinator processors may be configured to determine 1303, for each maneuver combination $(M_i, M_j)$ the conflict indicator $A_{ij}$ based on the safety driving model of the coordinator. For example, the conflict indicator(s) $A_{ij}$ may be provided as output parameter of the safety driving model of the coordinator. The maneuver list 301a, 301b may be provided as input parameter of the safety driving model of the coordinator. Optionally, the vehicular ratings $R_{ij}$ may be provided as input parameter of the safety driving model of the coordinator.

As illustrated, the conflict indicator(s) $A_{ij}$ may be entries of the combination tensor 1401 on the conflict indicator level 1503 (illustratively, a cross section through the combination tensor 1401). The conflict indicator $A_{ij}=1$ may indicate that the maneuver is unendangered. The conflict indicator $A_{ij}=0$ may indicate that the maneuver is endangered.

Figure 16:
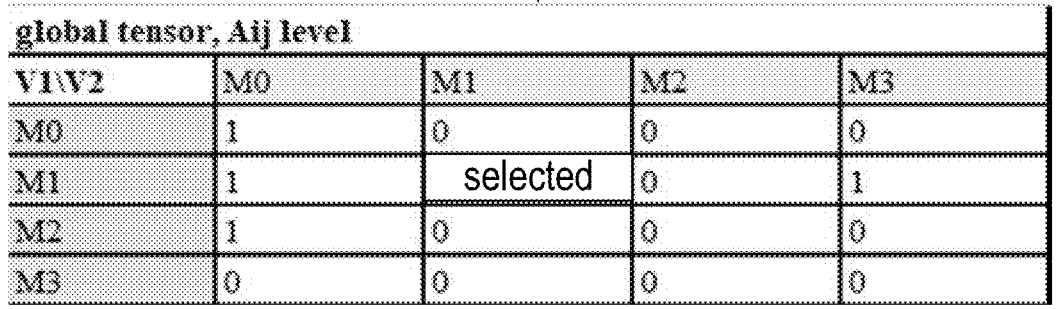
FIG. 16 shows an exemplary implementation of the maneuver combination selection according to various aspects of the disclosure in a schematic flow diagram.

FIG. 16 shows an exemplary implementation 1600 of the maneuver combination selection 1305 according to various aspects, illustrating the combination tensor 1401 on conflict indicator level 1503. The maneuver combination selection 1305 may include that the one or more coordinator processors select one of the maneuver combinations as safe maneuver combination (having $A_{ij}=1$).

In an example, the one or more coordinator processors may be configured to select the safe maneuver combination based on the conflict indicator(s) $A_{ij}$ provided by the safety driving model of the coordinator, with optional enhanced information. Additionally or alternatively, the one or more coordinator processors may be configured to select the safe maneuver combination (having $A_{ij}=1$) based on the one or more vehicular ratings $R_{ij}$ extracted from the maneuver lists 301a, 301b.

Illustratively, the one or more vehicular ratings $R_{ij}$ may serve as a guide for the search through the combination tensor, as the one or more vehicular ratings $R_{ij}$ provide a promising starting point for the a safety evaluation in the maneuver combination selection 1305. Further the one or more vehicular ratings $R_{ij}$ may represent the preferences of individual vehicles V1, V2.

In a less complex scenario, the safety of a maneuver as vehicular rating may be a good approximation of the conflict indicator(s) $A_{ij}$. For example, if the first vehicle V1 determines the potential maneuver M1 to be safe ($R_1=0$) and the second vehicle V1 determines the potential maneuver M0 to be safe ($R_0=0$), the rating $A_{10}$ may indicate that the maneuver combination $(M_1, M_0)$ is unendangered (e.g., $A_{10}=0$).

The search path through the combination tensor as implemented by the one or more coordinator processors may start from the most preferred maneuver combination (e.g., having the highest rating) and subsequently passing to nearest neighbors. This may help that the selected safe maneuver combination fits as good as possible with the preferences of the individual vehicles V1, V2. The search may be aborted once a safe maneuver combination is determined and selected, which significantly prunes the search tree and reduces computational complexity.

In a further example, the potential maneuvers are combined in a table to determine the best collaborative behavior. The coordinator may combine the sorted individual potential maneuvers in a common table. Starting from the most preferred and internally-safe combination (e.g., top left corner of the table), the coordinator determines the assessment to be assigned to the respective maneuver combination from his own perspective. The first collaboratively-safe combination may be selected as the safe maneuver combination.

Figure 17:
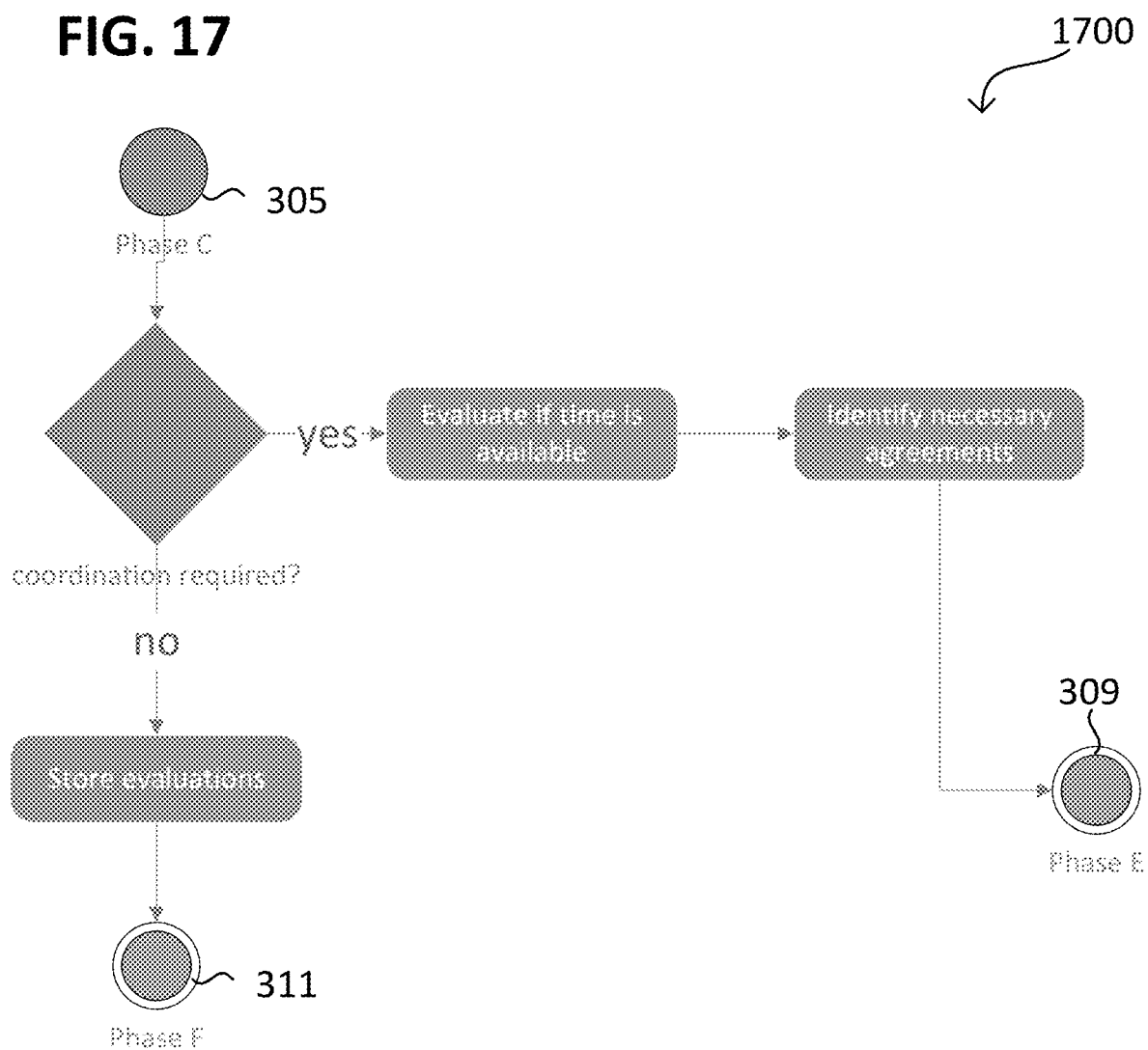
FIG. 17 shows an exemplary implementation of the conflict resolution according to various aspects of the disclosure in a schematic flow diagram.

FIG. 17 shows an exemplary implementation 1700 of the conflict resolution 307 according to various aspects.

The one or more coordinator processors may be configured to determine, if one or more maneuver combinations $(M_i, M_j)$ include one or more prioritized maneuvers (or otherwise highly rated) being in conflict with each other. Therefore, the combination tensor may be, for example, scanned in the order of vehicle priority, and maneuver priority.

As an illustrative example, the one or more coordinator processors may determine, if a maneuver of an ambulance was determined to be unsafe.

If it is determined that the combination list $\{M_i, M_j\}$ includes an prioritized maneuver combination being in conflict, the one or more coordinator processors may determine the remaining decision time, e.g., determine, if there is enough time left to attempt a coordination handshake to make the maneuver safe.

Figure 18:
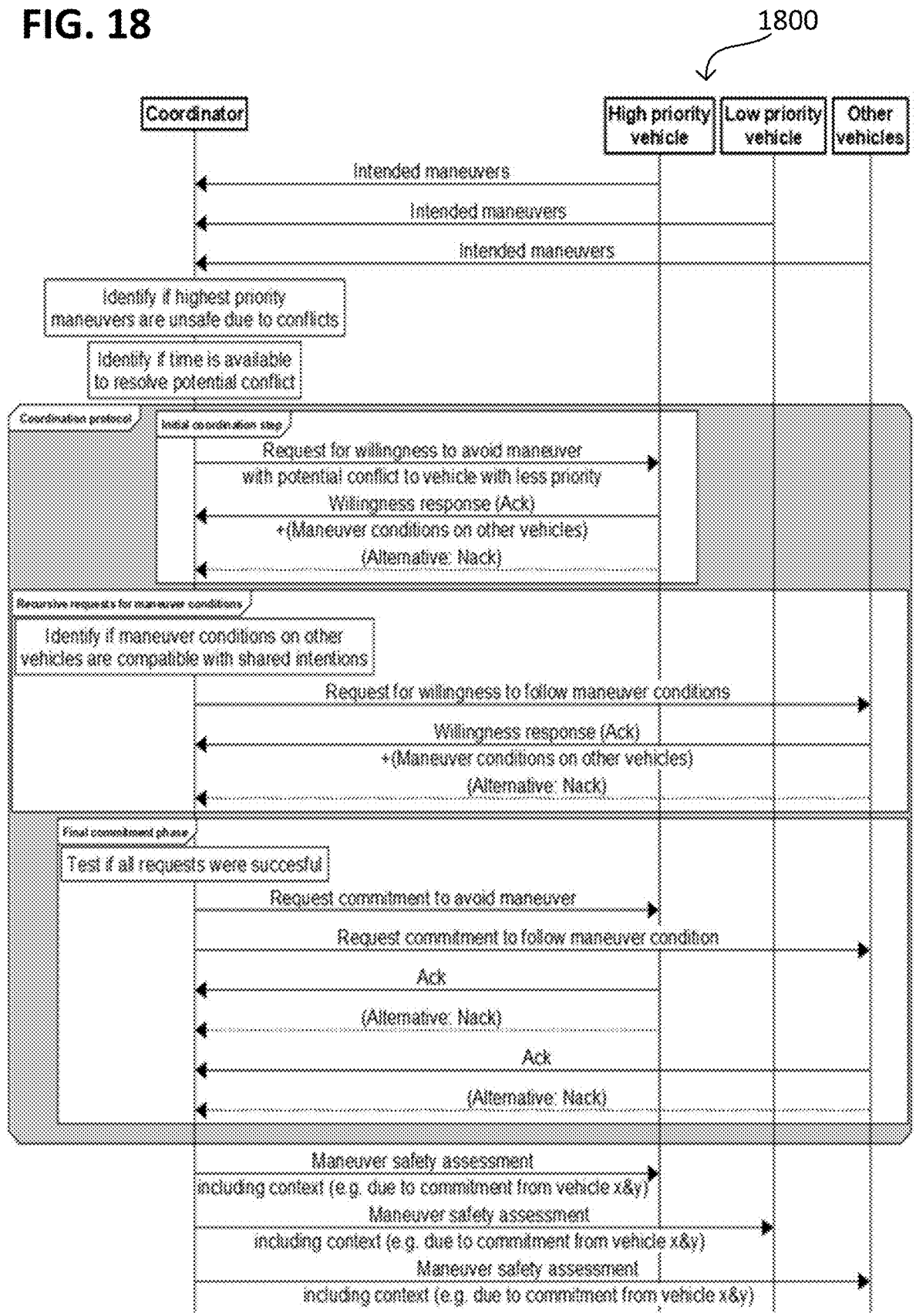
FIG. 18 shows an exemplary implementation of the conflict coordination according to various aspects of the disclosure in a schematic communication diagram.

FIG. 18 shows an exemplary implementation 1800 of the conflict coordination 309 according to various aspects (e.g., to coordinate a potential maneuver agreement). If the coordinator determines that there is enough time left to attempt a coordination handshake, the coordinator may initiate the coordination of maneuvers if it identified a highly rated maneuver to be unsafe, e.g., due to a potential conflict with a further maneuver.

The communication protocol for the message exchange 701 as implemented by the one or more coordinator processors according to implementation 1800 includes the following phases. In a first phase, the one or more coordinator processors determine the chain of maneuver agreements, e.g., based on a response of each contacted vehicle. For example, each contacted vehicle may respond, if it is willing to follow or avoid a maneuver and provide its own conditions for doing so. In a second phase, the one or more coordinator processors determine if the chain of maneuver agreements is plausible, and if so, request a "commitment"

from the contacted vehicles. In case each contacted vehicles provides the commitment, the maneuver may be re-assigned, e.g., to the first assessment (illustratively, as being safe). The result of the re-assessed maneuver combination may be communicated to the group of N vehicles.

Based thereon, each vehicle 100 of the group of N vehicles may determine, if the proposed maneuver is selected as planned maneuver (as committed) or not, e.g., based on the information that the safety of the proposed maneuver is dependent on whether the other vehicles of the group of N vehicles follow their commitment.

An undepicted example of the assessment feedback 311 may include that the one or more assessments 313a, 313b as assigned to the maneuver list 301a, 301b received from a vehicle 100 are communicated from the coordinator to the vehicle. The one or more assessments 313a, 313b may include a safety level and optionally the respective context for each maneuver of the maneuver list 301a, 301b. For example, the first vehicle V1 may receive that the first maneuver M1 is assessed as safe, e.g., as it was established during a coordination handshake resulting in the commitment that the second vehicle V2 will not overtake. Therefore, the third assessment may be assigned to M1, and the third assessment may include as context information the circumstances, under which a conflict appears or is avoided. For example, the first vehicle V1 may be provided with information that there is a potential conflict and the second vehicle V2 at least communicated a commitment for avoiding the potential conflict.

An undepicted example of the maneuver decision 315 includes that each vehicle determines the planned maneuver based on the assessment(s) of the assessment feedback 311 and optionally the context provided as part of the assessment feedback 311 by the coordinator. For the maneuver decision 315, the one or more vehicular processors 102 may implement an algorithm to execute the planned maneuver, and, if present, to take caution due to the potential conflict. Additionally or alternatively, the one or more vehicular processors 102 may fuse the safety assessment(s) of the assessment feedback 311 with the output of the vehicular safety driving model (illustratively, a local estimation), and/or perform a consistency check to validate the proper functionality of its sensors.

An undepicted example of the maneuver decision 315 includes that the output of the vehicular safety driving model is maintained parallel to the assessment(s) provided by assessment feedback 311.

Another example of the maneuver decision 315 includes that the output of the vehicular safety driving model is replaced by the assessment(s) provided by the assessment feedback 311.

An undepicted example of the maneuver decision 315 includes that the input of the vehicular safety driving model is replaced by information based on the assessment feedback 311.

According to various aspects, there might be a scenario, in which only one maneuver is acceptable for the first vehicle, but one or more second vehicles around may determine more than one potential maneuver. In at least one aspect, an ambulance/police implemented as a first vehicle may have to overtake with priority (e.g., absolute priority). This priority may be fed as a rating to the assessment determination 305 and optionally fed as a rating to the conflict coordination 309 (e.g., communicated by the coordination handshake). As result, the one or more second vehicles may select one of potential maneuvers (e.g., of at least two proposed maneuver) that is not in conflict with the one maneuver that acceptable for a the first vehicle. Also, the first vehicle may provide one or more potential maneuver as workaround for the one maneuver that is acceptable for a the first vehicle. In this case, also the first vehicle may receive a respective assessment for each of the alt least two proposed maneuvers.

In the following, various aspects of the disclosure will be illustrated:

Example 1 is a controller for an autonomous vehicle (e.g., providing for a vehicular maneuver decision), the controller including: one or more processors configured to: determine a maneuver planned for the vehicle based on a safety driving model and based on a first message from (e.g., in accordance with a mobile network communication protocol) a vehicle-external network component (e.g., the coordinator), the first message including, for each proposed maneuver of at least two maneuvers proposed for the vehicle, a respective assessment, and provide (e.g., generate) an in-vehicle instruction (also referred to as vehicular instruction) to perform the maneuver planned for the vehicle, e.g., the instruction being in accordance with an in-vehicle communication protocol (e.g., a fieldbus communication protocol).

Example 2 is the controller of Example 1, wherein the at least two maneuvers proposed for the vehicle include the maneuver planned for the vehicle.

Example 3 is the controller of Example 1 or 2, wherein the one or more processors are further configured to: determine a plurality of potential maneuvers of the vehicle based on the safety driving model, and generate a second message (e.g., in accordance with a mobile network communication protocol) to the network component, the second message including the plurality of potential maneuvers of the vehicle, e.g., the second message being generated before the maneuver planned for the vehicle is determined.

Example 4 is the controller of Example 3, wherein the one or more processors are configured to determine the plurality of potential maneuvers further based on sensor data related to the vehicle (e.g., including information about the vehicle) and/or related to a vicinity of the vehicle (e.g., the sensor data being provided to the safety driving model).

Example 5 is the controller of Example 3 or 4, wherein the plurality of potential maneuvers of the vehicle include the at least two maneuvers proposed for the vehicle.

Example 6 is the controller of one of the Examples 3 to 5, wherein the second message further includes one or more first parameters provided by the safety driving model of the vehicle and/or one or more first parameters provided to the safety driving model of the vehicle.

Example 7 is the controller of one of the Examples 3 to 6, wherein the second message includes, for each potential maneuver of the plurality of potential maneuvers, an associated classification (e.g., rating) of the respective maneuver, e.g., a rating according to a rating criterion.

Example 8 is the controller of Example 7, wherein the classification represents (e.g., indicates) a rating of the maneuver (e.g., according to a rating criterion), e.g., regarding a preference, a urgency and/or a safety.

Example 9 is the controller of one of the Examples 1 to 8, wherein the one or more processors are configured to determine the maneuver planned for the vehicle based on the assessment of each maneuver of at least two maneuvers.

Example 10 is the controller of one of the Examples 1 to 9, wherein the one or more processors are further configured to: generate a third message (e.g., to the vehicle-external network or to a further vehicle and/or in accordance with a mobile network communication protocol), the third message indicating the selected maneuver planned for the vehicle and/or a commitment to perform the maneuver planned for the vehicle.

Example 11 is the controller of one of the Examples 1 to 10, wherein the one or more processors are further configured to: determine the maneuver planned for the vehicle further based on a negotiation of the vehicle with the network component.

Example 12 is the controller of one of the Examples 1 to 11, wherein the one or more processors are configured to determine the maneuver planned for the vehicle further based on a communication with a further vehicle and/or based on a commitment of the further vehicle.

Example 13 is a controller for an autonomous vehicle, including one or more processors configured to: generate a first message to a vehicle-external network component (e.g., according to a mobile network communication protocol), the first message including a plurality of potential maneuvers of the vehicle determined based on a safety driving model; determine a maneuver planned for the vehicle based on the safety driving model and based on a second message (e.g., in accordance with a mobile network communication protocol) from the vehicle-external network component, the second message indicating one or more maneuvers of the plurality of potential maneuvers; provide an in-vehicle instruction to perform the maneuver planned for the vehicle, e.g., the instruction being in accordance with an in-vehicle communication protocol (e.g., a fieldbus communication protocol).

Example 14 is the controller of Example 13, the second message indicating the one or more maneuvers of the plurality of potential maneuvers by a respective assessment.

Example 15 is a network component (e.g., providing a coordinator), including one or more processors configured to: assign an assessment out of a plurality of assessments to each of a plurality of first maneuvers provided by a first vehicle, based on one or more second maneuvers provided by a second vehicle; generate a first message to the first vehicle (e.g., according to a mobile network communication protocol), the first message indicating, for each of the plurality of first maneuvers, the assigned assessment.

Example 16 is the network component of Example 15, wherein the one or more processors are configured to assign the assessment to each of the plurality of first maneuvers further based on one or more first parameters provided by a safety driving model of the first vehicle; and/or wherein the one or more processors are configured to assign the assessment to each of the plurality of first maneuvers further based on the one or more second parameters provided by a safety driving model of the second vehicle.

Example 17 is the network component of Example 15 or 16, wherein the one or more processors are further configured to: assign an assessment out of a plurality of assessments to each of the one or more second maneuvers provided by the second vehicle based on the plurality of first maneuvers provided by the first vehicle; generate a second message to the second vehicle (e.g., according to a mobile network communication protocol), the second message indicating, for each of the one or more second maneuvers, the assigned assessment, e.g., the second message being generated before the maneuver planned for the vehicle is determined.

Example 18 is the network component of Example 17, wherein the one or more processors are configured to assign the assessment to each of the one or more second maneuvers further based on one or more first parameters provided to or by a safety driving model of the first vehicle; and/or wherein the one or more processors are configured to assign the assessment to each of the one or more second maneuvers further based on the one or more second parameters provided to or by a safety driving model of the second vehicle.

Example 19 is the network component of one of the Examples 15 to 18, wherein the one or more processors are further configured to assign the assessment to each of the plurality of first maneuvers based on a safety driving model.

Example 20 is the network component of one of the Examples 15 to 19, wherein the one or more processors are further configured to assign the assessment to each of the plurality of first maneuvers further based on a first rating for each of the plurality of first maneuvers (e.g., according to a rating criterion) and/or based on a second rating for each of the one or more second maneuvers (e.g., according to a rating criterion); wherein the first rating is provided by the first vehicle and/or wherein the second rating is provided by the second vehicle.

Example 21 is the network component of one of the Examples 15 to 20, wherein the one or more processors are further configured to assign the assessment to each of the plurality of first maneuvers based on sensor data related to one or more of the following: the first vehicle, a vicinity of the first vehicle, the second vehicle, and/or a vicinity of the second vehicle.

Example 22 is the network component of Example 21, wherein the sensor data originates from one or more of the following: the first vehicle, the second vehicle, and/or one or more stationary sensors (e.g., road side sensors).

Example 23 is the network component of one of the Examples 15 to 22, wherein the one or more processors are further configured to assign the assessment to each of the plurality of first maneuvers including determining for each of the plurality of first maneuvers whether conflicting with the one or more second maneuvers.

Example 24 is the network component of one of the Examples 15 to 23, wherein the assessment for each of the plurality of first maneuvers represents at least one of the following: the maneuver is unendangered (e.g., safe and/or no conflicts determined), the maneuver is a partially endangered (e.g., potential conflicts determined), and/or the maneuver is an endangered (e.g., unsafe and/or conflict determined).

Example 25 is the network component of one of the Examples 15 to 24, wherein the one or more processors are further configured to assign the assessment to each of the plurality of first maneuvers further based on a negotiation with the first vehicle and/or the second vehicle.

Example 26 is a controller for an autonomous vehicle (e.g., providing for a vehicular driving intention sequence decision), the controller including: one or more processors configured to: select a vehicle driving intention sequence for the vehicle from a plurality of vehicle driving intention sequences based on a safety driving model and based on a ranking of the plurality of vehicle driving intention sequences, the ranking provided by a vehicle-external network component; and generate an in-vehicle instruction to perform the selected vehicle driving intention sequence for the vehicle, e.g., the instruction being in accordance with an in-vehicle communication protocol (e.g., a fieldbus communication protocol).

Example 27 is the controller of Example 26, wherein the one or more processors are further configured to: determine the plurality of vehicle driving intention sequence of the vehicle based on the safety driving model, and provide the plurality of vehicle driving intention sequences to the network component.

Example 28 is the controller of Example 27, wherein the one or more processors are configured to determine the plurality of vehicle driving intention sequences further based on sensor data related to the vehicle (e.g., including information about the vehicle) and/or a vicinity of the vehicle (e.g., the sensor data being provided to the safety driving model).

Example 29 is the controller of Example 27 or 28, wherein the ranking is provided by a network component as response to being provided with the plurality of vehicle driving intention sequences.

Example 30 is the controller of one of the Examples 27 to 29, wherein the one or more processors are further configured to: provide or more parameters output to or by the safety driving model of the vehicle to the network component.

Example 31 is the controller of one of the Examples 27 to 30, wherein the one or more processors are further configured to: provide, for each vehicle driving intention sequence of the plurality of vehicle driving intention sequence, an associated classification of the respective vehicle driving intention sequence to the network component.

Example 32 is the controller of Example 31, wherein the classification represents (e.g., indicates) a rating of the vehicle driving intention sequence, e.g., according to a rating criterion.

Example 33 is the controller of one of the Examples 26 to 32, wherein the one or more processors are further configured to: select the vehicle driving intention sequence further based on a negotiation of the vehicle with the network component.

Example 34 is the controller of one of the Examples 26 to 33, wherein the one or more processors are configured to select the vehicle driving intention sequence further based on a communication with a further vehicle and/or a commitment of the further vehicle.

Example 35 is a controlling means for an autonomous vehicle (e.g., providing for a vehicular maneuver decision), the controlling means including: one or more processing means configured for: determining a maneuver planned for the vehicle based on a safety driving model and based on a first message (e.g., in accordance with a mobile network communication protocol) from a vehicle-external network component means (e.g., the coordinator), the first message including, for each proposed maneuver of at least two maneuvers proposed for the vehicle, a respective assessment, and providing (e.g., generate) an in-vehicle instruction to perform the maneuver planned for the vehicle, e.g., the instruction being in accordance with an in-vehicle communication protocol (e.g., a fieldbus communication protocol).

Example 36 is the controlling means of Example 35, wherein the at least two maneuvers proposed for the vehicle include the maneuver planned for the vehicle.

Example 37 is the controlling means of Example 35 or 36, wherein the one or more processing means are further configured for: determining a plurality of potential maneuvers of the vehicle based on the safety driving model, and generating a second message (e.g., in accordance with a mobile network communication protocol) to the vehicle-external network component means, the second message including the plurality of potential maneuvers of the vehicle, e.g., the second message being generated before the maneuver planned for the vehicle is determined.

Example 38 is the controlling means of Example 37, wherein the one or more processing means are configured for determining the plurality of potential maneuvers further based on sensor data related to the vehicle (e.g., including information about the vehicle) and/or a vicinity of the vehicle (e.g., the sensor data being provided to the safety driving model).

Example 39 is the controlling means of Example 37 or 38, wherein the plurality of potential maneuvers of the vehicle include the at least two maneuvers proposed for the vehicle.

Example 40 is the controlling means of one of the Examples 37 to 39, wherein the second message further includes one or more parameters provided by the safety driving model of the vehicle.

Example 41 is the controlling means of one of the Examples 37 to 40, wherein the second message includes, for each potential maneuver of the plurality of potential maneuvers, an associated classification (e.g., rating) of the respective maneuver, e.g., a rating according to a rating criterion.

Example 42 is the controlling means of Example 41, wherein the classification represents (e.g., indicates) a rating of the maneuver (e.g., according to a rating criterion).

Example 43 is the controlling means of one of the Examples 35 to 42, wherein the one or more processing means are configured to determine the maneuver planned for the vehicle based on the assessment of each maneuver of at least two maneuvers.

Example 44 is the controlling means of one of the Examples 35 to 43, wherein the one or more processing means are further configured for: generating a third message (e.g., to the vehicle-external network component means or to a further vehicle and/or in accordance with a mobile network communication protocol), the third message indicating the selected maneuver planned for the vehicle and/or a commitment to perform the maneuver planned for the vehicle.

Example 45 is the controlling means of one of the Examples 35 to 44, wherein the one or more processing means are configured for determining the maneuver planned for the vehicle further based on a negotiation of the vehicle with the network component means.

Example 46 is the controlling means of one of the Examples 35 to 45, wherein the one or more processing means are configured for determining the maneuver planned for the vehicle further based on a communication with a further vehicle and/or based on a commitment of the further vehicle.

Example 47 is a controlling means for an autonomous vehicle, including one or more processing means configured for: generating a first message to a vehicle-external network component means (e.g., according to a mobile network communication protocol), the first message including a plurality of potential maneuvers of the vehicle determined based on a safety driving model; determining a maneuver planned for the vehicle based on the safety driving model and based on a second message (e.g., in accordance with a mobile network communication protocol) from the vehicle-external network component means, the second message indicating one or more maneuvers of the plurality of potential maneuvers; providing an in-vehicle instruction to perform the maneuver planned for the vehicle, e.g., the instruction being in accordance with an in-vehicle communication protocol (e.g., a fieldbus communication protocol).

Example 48 is the controlling means of Example 47, the second message indicating the one or more maneuvers of the plurality of potential maneuvers by a respective assessment.

Example 49 is a network component means (e.g., providing a coordinator), including one or more processing means configured for: assigning an assessment out of a plurality of assessments to each of a plurality of first maneuvers provided by a first vehicle, based on one or more second maneuvers provided by a second vehicle; generating a first message to the first vehicle (e.g., according to a mobile network communication protocol), the first message indicating, for each of the plurality of first maneuvers, the assigned assessment.

Example 50 is the network component means of Example 49, wherein the one or more processing means are configured for assigning the assessment to each of the plurality of first maneuvers further based on one or more first parameters provided by a safety driving model of the first vehicle; and/or wherein the one or more processing means are configured for assigning the assessment to each of the plurality of first maneuvers further based on the one or more second parameters provided by a safety driving model of the second vehicle.

Example 51 is the network component means of Example 49 or 50, wherein the one or more processing means are further configured for: assigning an assessment out of a plurality of assessments to each of the one or more second maneuvers provided by the second vehicle based on the plurality of first maneuvers provided by the first vehicle; generating a second message to the second vehicle (e.g., according to a mobile network communication protocol), the second message indicating, for each of the one or more second maneuvers, the assigned assessment, e.g., the second message being generated before the maneuver planned for the vehicle is determined.

Example 52 is the network component means of Example 51, wherein the one or more processing means are configured for assigning the assessment to each of the one or more second maneuvers further based on one or more first parameters provided by a safety driving model of the first vehicle; and/or wherein the one or more processing means are configured for assigning the assessment to each of the one or more second maneuvers further based on the one or more second parameters provided by a safety driving model of the second vehicle.

Example 53 is the network component means of one of the Examples 49 to 52, wherein the one or more processing means are further configured for assigning the assessment to each of the plurality of first maneuvers based on a safety driving model.

Example 54 is the network component means of one of the Examples 49 to 53, wherein the one or more processing means are further configured for assigning the assessment to each of the plurality of first maneuvers further based on a first rating for each of the plurality of first maneuvers (e.g., according to a rating criterion) and/or based on a second rating for each of the one or more second maneuvers (e.g., according to a rating criterion); wherein the first rating is provided by the first vehicle and/or wherein the second rating is provided by the second vehicle.

Example 55 is the network component means of one of the Examples 49 to 54, wherein the one or more processing means are further configured for assigning the assessment to each of the plurality of first maneuvers based on sensor data related to one or more of the following: the first vehicle, a vicinity of the first vehicle, the second vehicle, and/or a vicinity of the second vehicle.

Example 56 is the network component means of Example 55, wherein the sensor data originates from one or more of the following: the first vehicle, the second vehicle, and/or one or more stationary sensors (e.g., road side sensors).

Example 57 is the network component means of one of the Examples 49 to 56, wherein assigning each of the plurality of first maneuvers includes determining for each of the plurality of first maneuvers whether conflicting with the one or more second maneuvers.

Example 58 is the network component means of one of the Examples 49 to 57, wherein the assessment for each of the plurality of first maneuvers represents at least one of the following: the maneuver is unendangered (e.g., safe and/or no conflicts determined), the maneuver is a partially endangered (e.g., potential conflicts determined), and/or the maneuver is an endangered (e.g., unsafe and/or conflict determined).

Example 59 is the network component means of one of the Examples 49 to 58, wherein the one or more processing means are further configured for assigning each of the plurality of first maneuvers further based on a negotiation with the first vehicle and/or the second vehicle.

Example 60 is a controlling means for an autonomous vehicle (e.g., providing for a vehicular driving intention sequence decision), the controlling means including: one or more processing means configured for: selecting a vehicle driving intention sequence for the vehicle from a plurality of vehicle driving intention sequences based on a safety driving model and based on a ranking of the plurality of vehicle driving intention sequences, the ranking provided by a vehicle-external network component means; and generating an in-vehicle instruction to perform the selected vehicle driving intention sequence for the vehicle, e.g., the instruction being in accordance with an in-vehicle communication protocol (e.g., a fieldbus communication protocol).

Example 61 is the controlling means of Example 60, wherein the one or more processing means are further configured for determining the plurality of vehicle driving intention sequence of the vehicle based on the safety driving model, and provide the plurality of vehicle driving intention sequences to the network component means.

Example 62 is the controlling means of Example 61, wherein the one or more processing means are configured for determining the plurality of vehicle driving intention sequences further based on sensor data related to the vehicle (e.g., including information about the vehicle) and/or a vicinity of the vehicle (e.g., the sensor data being provided to the safety driving model).

Example 63 is the controlling means of Example 61 or 62, wherein the ranking is provided by a network component means as response to being provided with the plurality of vehicle driving intention sequences.

Example 64 is the controlling means of one of the Examples 61 to 63, wherein the one or more processing means are further configured for: providing or more parameters output to or by the safety driving model of the vehicle to the network component means.

Example 65 is the controlling means of one of the Examples 61 to 64, wherein the one or more processing means are further configured for providing, for each vehicle driving intention sequence of the plurality of vehicle driving intention sequence, an associated classification of the respective vehicle driving intention sequence to the network component means.

Example 66 is the controlling means of Example 65, wherein the classification represents (e.g., indicates) a rating of the vehicle driving intention sequence (e.g., according to a rating criterion).

Example 67 is the controlling means of one of the Examples 60 to 66, wherein the one or more processing means are further configured for selecting the vehicle driving intention sequence further based on a negotiation of the vehicle with the network component means.

Example 68 is the controlling means of one of the Examples 60 to 67, wherein the one or more processing means are configured for selecting the vehicle driving intention sequence further based on a communication with a further vehicle and/or based on a commitment of the further vehicle.

Example 69 is a controlling method for an autonomous vehicle (e.g., providing for a vehicular maneuver decision), the controlling method including: determining a maneuver planned for the vehicle based on a safety driving model and based on a first message (e.g., in accordance with a mobile network communication protocol) from a vehicle-external network component (e.g., the coordinator), the first message including, for each proposed maneuver of at least two maneuvers proposed for the vehicle, a respective assessment; and providing (e.g., generate) an in-vehicle instruction to perform the maneuver planned for the vehicle, e.g., the instruction being in accordance with an in-vehicle communication protocol (e.g., a fieldbus communication protocol).

Example 70 is the controlling method of Example 69, wherein the at least two maneuvers proposed for the vehicle include the maneuver planned for the vehicle.

Example 71 is the controlling method of Example 69 or 70, further including: determining a plurality of potential maneuvers of the vehicle based on the safety driving model, and generating a second message (e.g., in accordance with a mobile network communication protocol) to the vehicle-external network component, the second message including the plurality of potential maneuvers of the vehicle, e.g., the second message being generated before the maneuver planned for the vehicle is determined.

Example 72 is the controlling method of Example 71, wherein determining the plurality of potential maneuvers is further based on sensor data related to the vehicle (e.g., including information about the vehicle) and/or a vicinity of the vehicle (e.g., the sensor data being provided to the safety driving model).

Example 73 is the controlling method of Example 71 or 72, wherein the plurality of potential maneuvers of the vehicle include the at least two maneuvers proposed for the vehicle.

Example 74 is the controlling method of one of the Examples 71 to 73, wherein the second message further includes one or more parameters provided by the safety driving model of the vehicle.

Example 75 is the controlling method of one of the Examples 71 to 74, wherein the second message includes, for each potential maneuver of the plurality of potential maneuvers, an associated classification (e.g., rating) of the respective maneuver, e.g., a rating according to a rating criterion.

Example 76 is the controlling method of Example 75, wherein the classification represents (e.g., indicates) a rating of the maneuver (e.g., according to a rating criterion).

Example 77 is the controlling method of one of the Examples 69 to 76, wherein determining the maneuver planned for the vehicle is based on the assessment of each maneuver of at least two maneuvers.

Example 78 is the controlling method of one of the Examples 69 to 77, further including: generating a third message (e.g., to the vehicle-external network component or to a further vehicle and/or in accordance with a mobile network communication protocol), the third message indicating the selected maneuver planned for the vehicle and/or a commitment to perform the maneuver planned for the vehicle.

Example 79 is the controlling method of one of the Examples 69 to 78, further including: determining the maneuver planned for the vehicle further based on a negotiation of the vehicle with the network component.

Example 80 is the controlling method of one of the Examples 69 to 79, wherein determining the maneuver planned for the vehicle is further based on a communication with a further vehicle and/or based on a commitment of the further vehicle.

Example 81 is one or more non-transitory computer-readable media storing instructions thereon that, when executed by at least one processor, direct the at least one processor to perform the controlling method of one of the Examples 69 to 80.

Example 82 is a controlling method for an autonomous vehicle, including: generating a first message to a vehicle-external network component (e.g., according to a mobile network communication protocol), the first message including a plurality of potential maneuvers of the vehicle determined based on a safety driving model; determining a maneuver planned for the vehicle based on the safety driving model and based on a second message (e.g., in accordance with a mobile network communication protocol) from the vehicle-external network component, the second message indicating one or more maneuvers of the plurality of potential maneuvers; providing an in-vehicle instruction to perform the maneuver planned for the vehicle, e.g., the instruction being in accordance with an in-vehicle communication protocol (e.g., a fieldbus communication protocol).

Example 83 is the controlling method of Example 82, the second message indicating the one or more maneuvers of the plurality of potential maneuvers by a respective assessment, e.g., the second message being generated before the maneuver planned for the vehicle is determined.

Example 84 is one or more non-transitory computer-readable media storing instructions thereon that, when executed by at least one processor, direct the at least one processor to perform the controlling method of Example 82 or 83.

Example 85 is a method for a network component (e.g., providing a coordinator), the method including: assigning an assessment out of a plurality of assessments to each of a plurality of first maneuvers provided by a first vehicle, based on one or more second maneuvers provided by a second vehicle; generating a first message to the first vehicle (e.g., according to a mobile network communication protocol), the first message indicating, for each of the plurality of first maneuvers, the assigned assessment.

Example 86 the method of Example 85, wherein assigning each of the plurality of first maneuvers to the assessment is further based on one or more first parameters provided by a safety driving model of the first vehicle; and/or wherein assigning each of the plurality of first maneuvers to the assessment is further based on the one or more second parameters provided by a safety driving model of the second vehicle.

Example 87 the method of Example 85 or 86, further including: assigning an assessment out of a plurality of assessments to each of the one or more second maneuvers provided by the second vehicle based on the plurality of first maneuvers provided by the first vehicle; and generating a second message to the second vehicle (e.g., according to a mobile network communication protocol), the second message indicating, for each of the one or more second maneuvers, the assigned assessment, e.g., the second message being generated before the maneuver planned for the vehicle is determined.

Example 88 the method of Example 87, wherein assigning each of the one or more second maneuvers to the assessment further is based on one or more first parameters provided by a safety driving model of the first vehicle; and/or wherein assigning each of the one or more second maneuvers to the assessment is further based on the one or more second parameters provided by a safety driving model of the second vehicle.

Example 89 the method of one of the Examples 85 to 88, further including: assigning each of the plurality of first maneuvers to the assessment based on a safety driving model.

Example 90 the method of one of the Examples 85 to 89, wherein assigning each of the plurality of first maneuvers to the assessment is further based on a first rating for each of the plurality of first maneuvers (e.g., according to a rating criterion) and/or based on a second rating for each of the one or more second maneuvers (e.g., according to a rating criterion); wherein the first rating is provided by the first vehicle and/or wherein the second rating is provided by the second vehicle.

Example 91 the method of one of the Examples 85 to 90, wherein assigning each of the plurality of first maneuvers to the assessment is based on sensor data related to one or more of the following: the first vehicle, a vicinity of the first vehicle, the second vehicle, and/or a vicinity of the second vehicle.

Example 92 the method of Example 91, wherein the sensor data originates from one or more of the following: the first vehicle, the second vehicle, and/or one or more stationary sensors (e.g., road side sensors).

Example 93 the method of one of the Examples 85 to 92, wherein assigning each of the plurality of first maneuvers includes determining for each of the plurality of first maneuvers whether conflicting with the one or more second maneuvers.

Example 94 the method of one of the Examples 85 to 93, wherein the assessment for each of the plurality of first maneuvers represents at least one of the following: the maneuver is unendangered (e.g., safe and/or no conflicts determined), the maneuver is a partially endangered (e.g., potential conflicts determined), and/or the maneuver is an endangered (e.g., unsafe and/or conflict determined).

Example 95 the method of one of the Examples 85 to 94, wherein assigning each of the plurality of first maneuvers is further based on a negotiation with the first vehicle and/or the second vehicle.

Example 96 is one or more non-transitory computer-readable media storing instructions thereon that, when executed by at least one processor, direct the at least one processor to perform the method of Examples 85 to 95.

Example 97 is a controlling method for an autonomous vehicle (e.g., providing for a vehicular driving intention sequence decision), the controlling method including: selecting a vehicle driving intention sequence for the vehicle from a plurality of vehicle driving intention sequences based on a safety driving model and based on a ranking of the plurality of vehicle driving intention sequences, the ranking provided by a vehicle-external network component; and generating an in-vehicle instruction to perform the selected vehicle driving intention sequence for the vehicle, e.g., the instruction being in accordance with an in-vehicle communication protocol (e.g., a fieldbus communication protocol).

Example 98 is the controlling method of Example 97, further including: determining the plurality of vehicle driving intention sequence of the vehicle based on the safety driving model, and providing the plurality of vehicle driving intention sequences to the network component.

Example 99 is the controlling method of Example 98, wherein determining the plurality of vehicle driving intention sequences further based on sensor data related to the vehicle (e.g., including information about the vehicle) and/or a vicinity of the vehicle (e.g., the sensor data being provided to the safety driving model).

Example 100 is the controlling method of Example 98 or 99, wherein the ranking is provided by a network component as response to being provided with the plurality of vehicle driving intention sequences.

Example 101 is the controlling method of one of the Examples 98 to 100, further including: providing or more parameters output to or by the safety driving model of the vehicle to the network component.

Example 102 is the controlling method of one of the Examples 98 to 101, further including: providing, for each vehicle driving intention sequence of the plurality of vehicle driving intention sequence, an associated classification of the respective vehicle driving intention sequence to the network component.

Example 103 is the controlling method of Example 102, wherein the classification represents (e.g., indicates) a rating of the vehicle driving intention sequence, e.g., a rating according to a rating criterion.

Example 104 is the controlling method of one of the Examples 97 to 103, further including: selecting the vehicle driving intention sequence further based on a negotiation of the vehicle with the network component.

Example 105 is the controlling method of one of the Examples 97 to 104, wherein selecting the vehicle driving intention sequence is further based on a communication with a further vehicle and/or based on a commitment of the further vehicle.

Example 106 is one or more non-transitory computer-readable media storing instructions thereon that, when executed by at least one processor, direct the at least one processor to perform the controlling method of one of the Examples 97 to 105.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A controller for an autonomous vehicle, the controller comprising:
one or more processors configured to:
determine a plurality of potential maneuvers the vehicle may perform at a predetermined time based on a safety driving model of the vehicle;
transmit in a first message the plurality of potential maneuvers to a vehicle-external network component;
receive a plurality of proposed maneuvers for the vehicle from the vehicle-external network component, wherein the plurality of proposed maneuvers comprises a subset of the plurality of potential maneuvers, wherein each proposed maneuver of the plurality of proposed maneuvers is associated with a respective vehicle-external assessment that is based on a vehicle-external safety rating model and takes into account an expected maneuver at the predetermined time of at least one other vehicle;
determine a planned maneuver for the vehicle from among the plurality of proposed maneuvers based on the respective assessment for each proposed maneuver of the plurality of proposed maneuvers;
generate an in-vehicle instruction for the vehicle to perform the planned maneuver at the predetermined time; and
control the vehicle to perform the planned maneuver at the predetermined time according to the vehicle instruction to reduce a risk of occurrence of a dangerous situation at the predetermined time as between the vehicle and the at least one other vehicle.

2. The controller of claim 1, wherein the safety driving model of the vehicle is unable to account for the expected maneuver of the at least one other vehicle.

3. The controller of claim 1, wherein each potential maneuver of the plurality of potential maneuvers is associated with a rating of the potential maneuver according to the safety driving model and with a preference ranking of the potential maneuver that is ranked from among the plurality of potential maneuvers, wherein the first message comprises the plurality of potential maneuvers along with the rating and preference ranking for each potential maneuver.

4. The controller of claim 3, wherein the one or more processors are configured to determine the plurality of potential maneuvers further based on sensor data related to the vehicle or a vicinity of the vehicle.

5. The controller of claim 3, wherein the dangerous situation comprises a collision between the vehicle and the other vehicle at the predetermined time; or a distance between the vehicle and the at least one other vehicle that is below a predetermined threshold.

6. The controller of claim 3, wherein the first message further comprises, for each potential maneuver, one or more parameters provided to or by the safety driving model of the vehicle that are associated with the rating.

7. The controller of claim 1, wherein the one or more processors are further configured to generate a second message that indicates a commitment by the vehicle to perform the planned maneuver at the predetermined time.

8. The controller of claim 1, wherein the one or more processors are configured to determine the planned maneuver further based on a commitment by the at least one other vehicle to perform the at least one expected maneuver at the predetermined time.

9. A network component, comprising:
one or more processors configured to:
assign an assessment out of a plurality of assessments to each maneuver of a plurality of first maneuvers that a first vehicle may implement at a predetermined time, wherein each maneuver of the plurality of first maneuvers is associated with a respective safety rating received from the first vehicle, wherein the assessment is assigned based on the plurality of first maneuvers, the respective safety rating of the maneuver, and one or more second maneuvers provided by a second vehicle,
generate a first message to the first vehicle, the first message indicating the assigned assessment for each first maneuver of the plurality of first maneuvers; and
transmit the first message to the first vehicle for implementing a selected one of the plurality of first maneuvers at the predetermined time based on the assigned assessment in order to reduce a risk of occurrence of a dangerous situation at the predetermined time as between the vehicle and the at least one other vehicle.

10. The network component of claim 9, wherein the one or more processors are configured to assign the assessment to each maneuver of the plurality of first maneuvers further based on one or more first parameters associated with the respective safety rating provided from the first vehicle, wherein the one or more first parameters are associated with a safety driving model of the vehicle used to generate the respective safety rating.

11. The network component of claim 9, wherein the one or more processors are further configured to assign the assessment to each maneuver of the plurality of first maneuvers based on a global safety driving model of the network component.

12. The network component of claim 9,
wherein the one or more processors are configured to assign the assessment to each maneuver of the plurality of first maneuvers further based on a first rating of each maneuver of the plurality of first maneuvers according to a rating criterion; and
wherein the first rating is provided by the first vehicle.

13. The network component of claim 9, wherein the one or more processors are further configured to assign the assessment to each maneuver of the plurality of first maneuvers based on sensor data related to one or more of the following:
the first vehicle,
a vicinity of the first vehicle,
the second vehicle, and
a vicinity of the second vehicle.

14. The network component of claim 13, wherein the sensor data originates from one or more of the following: the first vehicle, the second vehicle, and one or more stationary sensors.

15. The network component of claim 9, wherein the one or more processors are further configured to assign each maneuver of the plurality of first maneuvers further based on a determination for each maneuver of the plurality of first maneuvers, whether a conflict exists with the one or more second maneuvers.

16. The network component of claim 9, wherein the assessment for each maneuver of the plurality of first maneuvers represents at least one of the following:
the maneuver is unendangered,
the maneuver is a partially endangered, or
the maneuver is an endangered.

17. The network component of claim 9, wherein the one or more processors are configured to assign the assessment to each maneuver of the plurality of first maneuvers further based on a negotiation with the first vehicle and/or the second vehicle.

18. A controller for an autonomous vehicle, the controller comprising:
one or more processors configured to:
select a vehicle driving intention sequence for the vehicle to perform over a predetermined time period from a plurality of vehicle driving intention sequences based on a safety driving model of the vehicle and based on a ranking of the plurality of vehicle driving intention sequences, the ranking provided by a vehicle-external network component according to a global safety driving model of the vehicle-external network component that takes into account an expected driving sequence at the predetermined time of at least one other vehicle;
generate an in-vehicle instruction for the vehicle to perform the selected vehicle driving intention sequence over the predetermined time period; and
control the vehicle to perform the selected vehicle driving intention sequence during the predetermined time according to the in-vehicle instruction in order to reduce a risk of occurrence of a dangerous situation at the predetermined time as between the vehicle and the at least one other vehicle.

* * * * *